United States Patent
Feder et al.

(10) Patent No.: US 9,218,662 B1
(45) Date of Patent: Dec. 22, 2015

(54) SYSTEM, METHOD, AND COMPUTER PROGRAM PRODUCT FOR EXCHANGING IMAGES

(71) Applicant: Duelight LLC, Sunnyvale, CA (US)

(72) Inventors: Adam Feder, Mountain View, CA (US); Brian Kindle, Sunnyvale, CA (US); William Rivard, Menlo Park, CA (US)

(73) Assignee: Duelight LLC, Sunnyvale, CA (US)

( * ) Notice: Subject to any disclaimer, the term of this patent is extended or adjusted under 35 U.S.C. 154(b) by 0 days.

(21) Appl. No.: 14/535,285

(22) Filed: Nov. 6, 2014

(51) Int. Cl.
*G06K 9/00* (2006.01)
*G06T 7/00* (2006.01)

(52) U.S. Cl.
CPC ............ *G06T 7/0022* (2013.01); *G06T 2200/24* (2013.01); *G06T 2207/10004* (2013.01); *G06T 2207/20092* (2013.01)

(58) Field of Classification Search
None
See application file for complete search history.

(56) References Cited

U.S. PATENT DOCUMENTS

| | | | |
|---|---|---|---|
| 8,878,963 B2 | 11/2014 | Prabhudesai et al. | |
| 8,988,559 B2 | 3/2015 | Chao et al. | |
| 9,083,935 B2 | 7/2015 | Demandolx et al. | |
| 2002/0060566 A1 | 5/2002 | Debbins et al. | |
| 2002/0107750 A1* | 8/2002 | Kanevsky et al. | 705/26 |
| 2006/0008171 A1 | 1/2006 | Petschnigg et al. | |
| 2006/0225034 A1 | 10/2006 | Peck et al. | |
| 2007/0025720 A1 | 2/2007 | Raskar et al. | |
| 2007/0165960 A1 | 7/2007 | Yamada | |
| 2007/0260979 A1* | 11/2007 | Hertzfeld et al. | 715/530 |
| 2008/0225057 A1* | 9/2008 | Hertzfeld et al. | 345/619 |
| 2008/0275881 A1* | 11/2008 | Conn et al. | 707/10 |
| 2009/0085919 A1 | 4/2009 | Chen et al. | |
| 2010/0299630 A1* | 11/2010 | McCutchen et al. | 715/803 |
| 2011/0145694 A1 | 6/2011 | Graves et al. | |
| 2011/0205395 A1 | 8/2011 | Levy | |
| 2013/0021358 A1 | 1/2013 | Nordlund et al. | |
| 2013/0141456 A1 | 6/2013 | Sokolov et al. | |
| 2013/0179308 A1* | 7/2013 | Agustin et al. | 705/27.1 |
| 2013/0235069 A1* | 9/2013 | Ubillos et al. | 345/594 |
| 2013/0262258 A1* | 10/2013 | Jennings | 705/26.4 |
| 2013/0342739 A1 | 12/2013 | Yanowitz et al. | |
| 2014/0140630 A1 | 5/2014 | Hwang et al. | |
| 2014/0176759 A1 | 6/2014 | Goto | |
| 2014/0279181 A1* | 9/2014 | Wills | 705/26.5 |
| 2014/0283113 A1* | 9/2014 | Hanna | 726/27 |
| 2014/0289360 A1* | 9/2014 | Mahkovec et al. | 709/217 |
| 2015/0063694 A1 | 3/2015 | Shroff et al. | |
| 2015/0092077 A1 | 4/2015 | Feder et al. | |
| 2015/0093044 A1 | 4/2015 | Feder et al. | |

OTHER PUBLICATIONS

Feder et al., U.S. Appl. No. 14/517,731, filed Oct. 17, 2014.
Feder et al., U.S. Appl. No. 14/503,210, filed Sep. 30, 2014.
Feder et al., U.S. Appl. No. 14/503,224, filed Sep. 30, 2014.
Kindle, B. et al., U.S. Appl. No. 14/547,074, filed Nov. 18, 2014.
Non-Final Office Action from U.S. Appl. No. 14/503,224, dated Sep. 2, 2015.
Non-Final Office Action from U.S. Appl. No. 14/517,731, dated Oct. 6, 2015.

\* cited by examiner

*Primary Examiner* — Sean Motsinger
(74) *Attorney, Agent, or Firm* — Zilka-Kotab, PC

(57) ABSTRACT

A system, method, and computer program product are provided for exchanging images. In use, one or more images are received at a server. Additionally, the one or more images are analyzed. Further, image processing code is outputted referencing the one or more images, based on the analysis of the one or more images. Additional systems, methods, and computer program products are also presented.

20 Claims, 17 Drawing Sheets

SYSTEM, METHOD, AND COMPUTER PROGRAM PRODUCT FOR EXCHANGING IMAGES

RELATED APPLICATIONS

This application is related to the following U.S. Patent Applications, the entire disclosures being incorporated by reference herein: application Ser. No. 14/517,731, filed Oct. 17, 2014, entitled "SYSTEM, COMPUTER PROGRAM PRODUCT, AND METHOD FOR GENERATING A LIGHTWEIGHT SOURCE CODE FOR IMPLEMENTING AN IMAGE PROCESSING PIPELINE"; application Ser. No. 14/503,210, filed Sep. 30, 2014, entitled "SYSTEMS, METHODS, AND COMPUTER PROGRAM PRODUCTS FOR DIGITAL PHOTOGRAPHY"; and application Ser. No. 14/503,224, filed Sep. 30, 2014, entitled "SYSTEMS, METHODS, AND COMPUTER PROGRAM PRODUCTS FOR DIGITAL PHOTOGRAPHY".

FIELD OF THE INVENTION

The present invention relates to digital photographic systems, and more particularly to systems and methods for exchanging images.

BACKGROUND

Traditional digital photography systems are generally limited by the number of ways in which a user can exchange images. One solution to such limitation is to transfer images to a second device which can then share the images in some manner. Such a solution, however, can be cumbersome, time consuming, and require many steps of interactions before achieving the desired result. As such, there is thus a need for addressing these and/or other issues associated with the prior art.

SUMMARY

A system, method, and computer program product are provided for exchanging images. In use, one or more images are received at a server. Additionally, the one or more images are analyzed. Further, image processing code is outputted referencing the one or more images, based on the analysis of the one or more images. Additional systems, methods, and computer program products are also presented.

DETAILED DESCRIPTION

Figure 1:
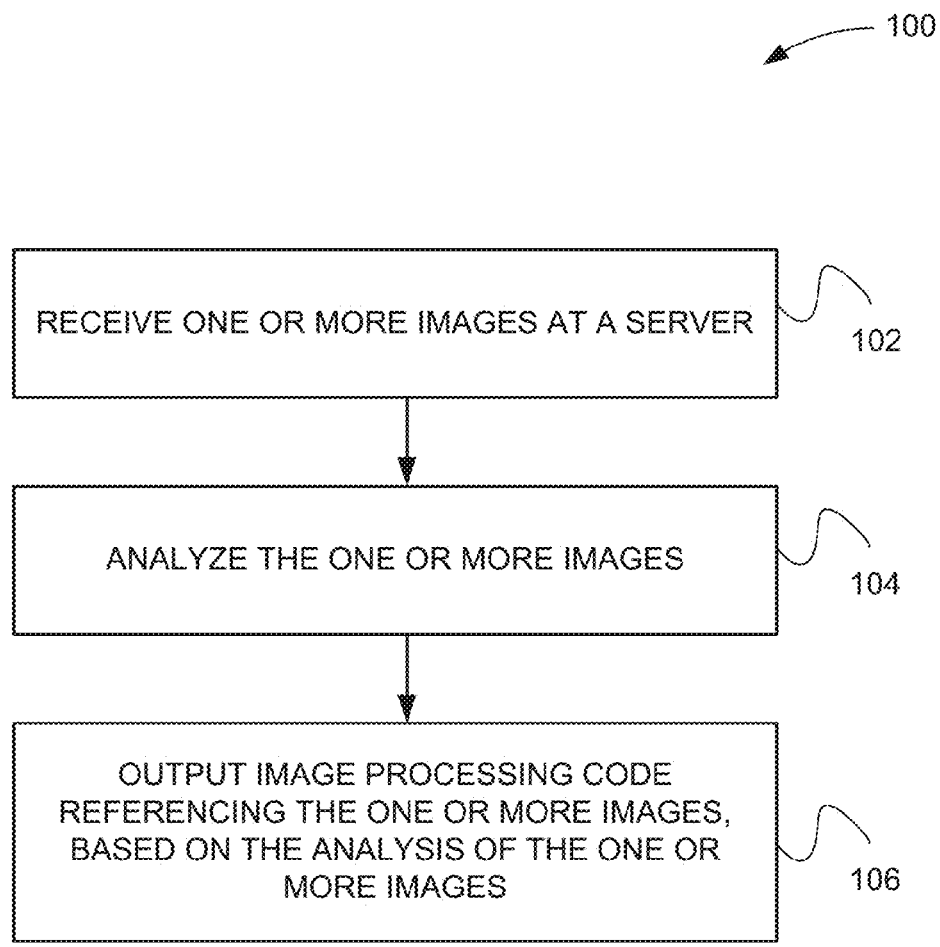
FIG. 1 illustrates an exemplary method for outputting image processing code, in accordance with one possible embodiment.

FIG. 1 illustrates an exemplary method 100 for outputting image processing code, in accordance with one embodiment. As an option, the method 100 may be carried out in the context of the details of any of the Figures disclosed herein. Of course, however, the method 100 may be carried out in any desired environment. Further, the aforementioned definitions may equally apply to the description below.

As shown, one or more images are received at a server. See operation 102. Additionally, the one or more images are analyzed. See operation 104. Lastly, image processing code referencing the one or more images is outputted, based on the analysis of the one or more images. See operation 106.

In the context of the present description, image processing code includes code used to process one or more images in some manner. For example, in various embodiments, image processing code may include WebGL, OpenGL code, OpenCL code, and/or any other code used to process graphics.

In one embodiment, the one or more images may be received at a server and analyzed upon receipt. In such an embodiment, the one or more images may be further outputted once the analyzing is complete. As such, in one embodiment, the flow of actions (e.g. images received, analysis of images, etc.) may be continuous until outputting occurs.

In another embodiment, the one or more images may be received and stored on a server, the analyzing and outputting occurring at a later time. In such an embodiment, the flow of actions (e.g. images received, analysis of images, etc.) may not be continuous from receipt of the images to the outputting. Of course, in other embodiments, the images may be stored for any length of time.

In one embodiment, the one or more images may include ancillary data associated with the one or more images. For example, in one embodiment, the one or more images may include metadata (e.g. camera type, film speed, ISO, aperture, etc.), and/or any other data (e.g. local URL to images and/or resources on the device which are being sent to the server, etc.) associated with the one or more images.

Still yet, in one embodiment, the analyzing may include at least one of creating at least one image, creating a high dynamic range (HDR) image, or processing at least one image. Of course, in other embodiments, the analyzing may include identifying metadata associated with an image, blending (or mixing) two or more images, applying an action based on metadata, and/or taking any other action associated with the image. Still yet, in some embodiments, analyzing the one or more images may include at least one of correcting white balance, correcting exposure levels, creating a high dynamic range (HDR) image, setting a black point, setting a white point, performing a dehaze function, performing a level mapping operation, performing a contrast enhancement operation, or adjusting a HDR strength. In a specific embodiment, a black point may be capable of being adjusted based on input by a user. In another embodiment, a white point may be capable of being adjusted based on input by a user.

In one embodiment, the image processing code may include or reference at least one image. For example, in such an embodiment, the image processing code may include one or more images, metadata (and/or other data) associated with the one or more images, local uniform resource locators (URLs) associated with the one or more images, instructions (e.g. for blending, for flattening, for creating a resulting image, etc.), and/or code for processing the one or more images in any manner. For example, in one embodiment, the image processing code may be sent back to a device from which the one or more images were received. In this embodiment, the image processing code may not send the original images back to the device, as they are already saved on the device, but may include code for processing (e.g. for blending, for flattening, for creating a resulting image, etc.) the one or more original images on the device. Of course, in such an embodiment, it is presumed that the resulting images can be created based on the one or more original images.

In another embodiment, the outputting may include at least one of providing access to a constructed web application associated with the one or more images, and/or pushing the web application associated with the one or more images to a recipient. In such an embodiment, the recipient may receive a URL (e.g. to a web application) and/or an address associated with the web application. The web application may include code to process the one or more images, and may permit the user, in real time, to manipulate the one or more images, including, but not limited to, blending two or more images, altering a parameter (e.g. exposure. ISO, warmth, color, saturation, contrast, etc.), identifying one or more points of interest (with potentially separate parameters, etc.), and/or applying any other modification to the one or more images.

In one embodiment, the outputting may include at least one of providing access to code created for rendering vector graphics in a web application, or providing access to a created resulting image which references one or more assets not stored on the server. For example, in one embodiment, one or more sections of code may be associated with a server, or may be associated entirely with the web application (e.g. functions and/or processing are not stored on a server, etc.). In another embodiment, the one or more assets not stored on the server may be stored on a client device such that a web application uses locally stored images in combination with the web application to create a resulting image. Further, in one embodiment, the outputting may include providing access to a created resulting image which references one or more assets not stored on the server. Additionally, in one embodiment, the one or more assets may be stored locally on a mobile device and/or any device (e.g. computer system, tablet, phone, etc.) which is separate from the server.

In an additional embodiment, the image processing code may reference one or more assets stored locally on the mobile device, as well as a resulting image stored on the server or, optionally, a different server. For example, in one embodiment, the web application may be accessed and utilized on a mobile device, and the image processing code may utilize one or more images on the mobile device as the basis for creating a resulting image. In one embodiment, the processing may occur via the image processing code which is sent from the server. Of course, in other embodiments, the resulting image may be stored in any location, including on the mobile device. In one embodiment, the resulting image may replace the one or more images originally used as the basis for creating the resulting image. In other embodiments, the resulting image may be added to the mobile device but not replace the one or more images. Still yet, in one embodiment, generating a resulting image may be based on one or more images, the resulting image being stored on the server.

In one embodiment, adjustable (e.g., sliding) indicia may be displayed utilizing a web application and one or more images may be blended based on a first aspect. Further, the one or more images may be blended based on a first aspect in response to the sliding indicia being manipulated by a user. In various embodiments, the first aspect may include at least one of a white balance, a focus, an exposure, a color correction, an intensity, and/or any other aspect associated with the one or more images.

In another embodiment, two or more versions of a web application associated with the one or more images may be constructed. For example, in one embodiment, at least one of the two or more versions may be associated with a paying account, a free account, a subscription service, a premium features account, and/or any other type of account. Of course, in one embodiment, a paying account (or any services based account) may be associated with a user identifier or a user account. In various embodiments, each version of the web application may provide a different set of features, at least in part, by which the one or more images are capable of being manipulated utilizing the web application.

Figure 2:
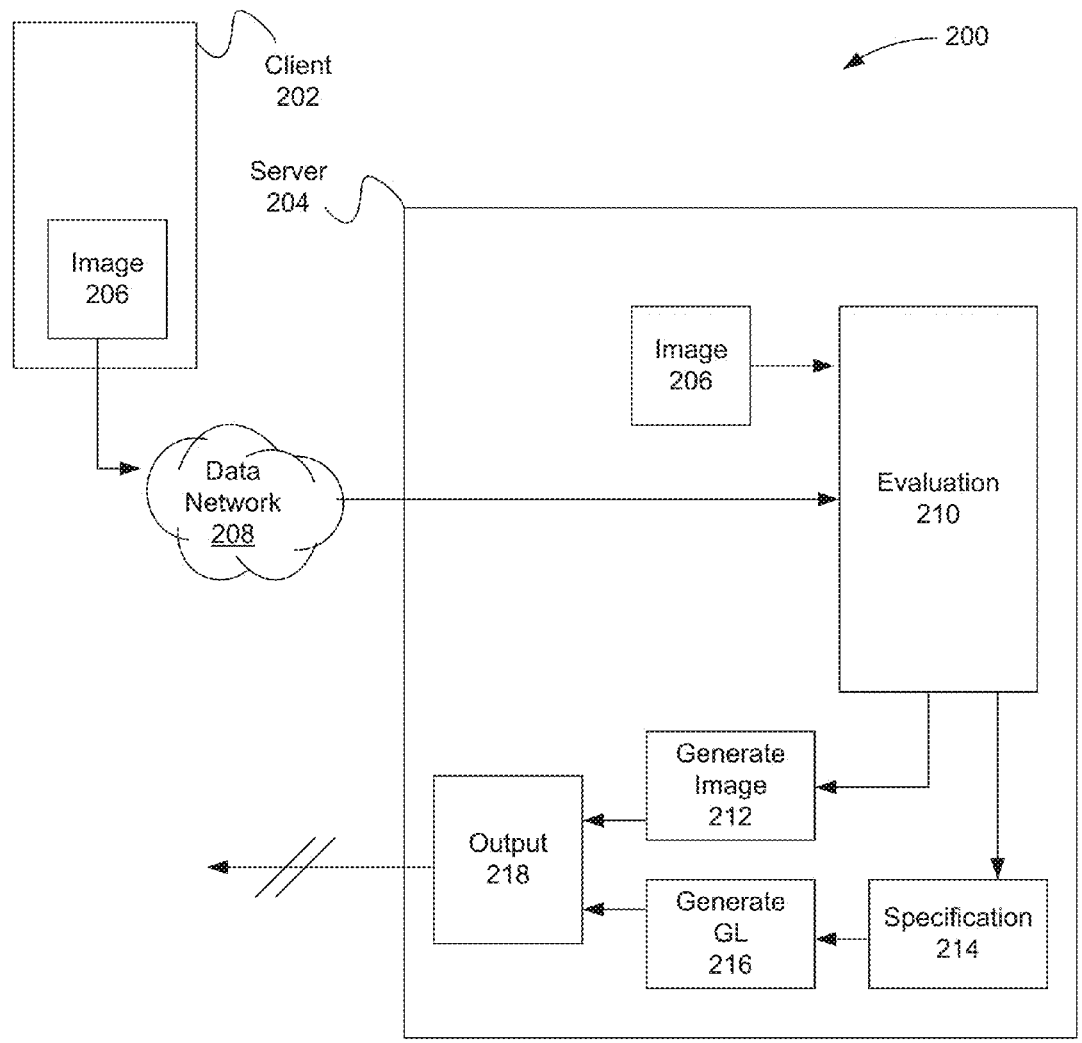
FIG. 2 illustrates an exemplary system carried out for outputting image processing code, in accordance with one embodiment.

FIG. 2 illustrates an exemplary system 200 carried out for outputting image processing code, in accordance with one embodiment. As an option, the system 200 may be implemented in the context of the details of any of the Figures disclosed herein. Of course, however, the system 200 may be implemented in any desired environment. Further, the aforementioned definitions may equally apply to the description below.

As shown, one or more images 206 may reside within a client 202. In one embodiment, the client 202 may be connected to a server 204 via a data network 208. For example, in one embodiment, the data network 208 may include an intranet, an internet, a local network (e.g. WLAN, WiFi, etc.), a cellular network, and/or any other type of network exchange.

As shown, one or more images 206 may reside within the server 204. The one or more images (e.g. from the client, from the server, etc.) 206 may be evaluated 210. In one embodiment, the evaluation 210 may cause an image 212 to be generated, and may cause a specification 214 to be created, the specification 214 being used to generate GL 216 (or any other processing code, etc.). Further, the generated image 212 and the generated GL 216 may comprise output 218.

In one embodiment, the evaluation may include generating processing code (e.g. GL code, GL object, WebGL object, etc.). In another embodiment, the evaluation may include forming a stack of images associated with processing code.

For example, in one embodiment, a stack of images may include a series of more than one images of differing exposure (e.g. EV−1, EV0, and EV+1, etc.) which may be blended to form a HDR image.

In another embodiment, the output 218 may include creating a package including the generated image 212 and the generated GL 216 (or any other processing code). In one embodiment, the output may include pushing the package to a client device. For example, the client device may include the client 202 which may have sent the one or more images 206 to the server 204. In the context of the present description, a package may include, at a minimum, one or more generated images or references to images, and processing code for the one or more images.

In one embodiment, the one or more images may be pushed to a server for evaluation, or the one or more images may be already stored on a server for evaluation. Additionally, in one embodiment, the one or more images may be cached (e.g. stored, etc.) at a time before the evaluation occurs. Of course, in another embodiment, the caching may occur automatically. For example, in one embodiment, the user may have taken one or more photos on a mobile device, the one or more photos being saved to the mobile device and automatically uploaded to an online server (e.g. online cache, etc.), whereupon the online server may then evaluate the one or more photos.

Still yet, in one embodiment, the server may evaluate one image or more than one image. For example, an evaluation may include multiple frames of an image capture (e.g. with respect to a HDR, with respect to multiple ambient images and multiple flash images, etc.). In one embodiment, multiple images may be processed (e.g. individually and collectively, etc.) via a server, thereby displacing processing demands from a client device (e.g. mobile phone, tablet, etc.). In such an embodiment, the server can process higher quality (e.g. higher resolution, full frame, etc.) images. For example, the server may be configured to perform more computationally intensive operations, or operations that require data that may not stored on the mobile device to generate the higher quality images.

In one embodiment, the evaluation may include generating an image. As an example, the generating may include combining multiple images (e.g. creating an HDR, etc.). Additionally, the evaluation may include creating a specification and then generating GL (e.g. processing code, etc.) associated with the generated image. In one embodiment, the generated image may be manipulated based on the generated GL (and/or created specification, etc.).

In one embodiment, the specification may be created based on the evaluation performed by the server. For example, in one embodiment, the server may determine that the image is overexposed and may apply a filter to adjust the exposure, a filter to adjust the color tone, and a filter to adjust the contrast. Such filters may be inputted into the specification which is used as the basis for creating the processing code (e.g. GL code, etc.). In one embodiment, the output that is created (e.g. including the generated image and the generated GL, etc.) may allow the user to modify the one or more filters in some manner. Such modification may be associated with a weight value associated with the one or more filters previously defined in the specification and accounted for in the GL. In this manner, in such an embodiment, modifications made to the filter may be computed by the GL and a resulting image, based on the one or more images (e.g. generated image, etc.) provided by the server and commands as dictated by the GL, may be created.

In some embodiments, the output may be dependent on a type of client (user account type). For example, in one embodiment, the output may be designated for a premium services, free services, subscription service, and/or any other specific service associated with a client or individual. In another embodiment, the output may include more than one versions which may take into account the many types of users which may access the web app.

As an example, the output may include a premium service, the premium service allowing manipulation of or access to many filters including, but not limited to, exposure, focus, warmth, contrast, saturation, blending, gain, color, and/or any other parameter associated with the one or more images. In one embodiment, such filters may be controlled and/or manipulated through user input. In one embodiment, the user input may include a slider, an input box of weights (e.g. increase or decrease weight of filter, etc.), a gesture (e.g. thumbs up to increase, thumbs down to decrease, etc.), and/or any other feature which may be used to provide an input in some manner.

In one embodiment, a user may select a filter to modify an image, and a slider may allow the user to provide input on how to modify the particular filter with respect to the image. In another embodiment, manipulating a slider may affect one or more filters. For example, in one embodiment, increasing a warmth of a photograph may include increasing a blend of a flash image, increasing a gain for an image, increasing a temperature of an image, and/or otherwise changing a variety of filters to optimize the warmth of an image. Of course, any filter may be included and/or changed in response to manipulating a slider. In this manner, manipulating a slider may affect and/or change more than one filter associated with the one or more images.

In another embodiment, the premium service may include the ability to control which images (as provided by the server) are used to create the resulting image. Additionally, the user may be able to select a color scheme associated with the image, including, but not limited to, RGB, grayscale, CMYK, and/or any other color scale as defined by the user.

In a separate embodiment, the output may include a free service. In such an embodiment, the user may be able to control a slider, but not otherwise be permitted to control a selection of one or more filters, source of images, and/or color scheme. In some embodiments, manipulating the slider may alter one or more underlying filters, the output image being optimized based on the one or more altered filters. In one embodiment, having a slider associated with more than one filters may be configured to optimize the final output. For example, increasing the exposure alone may cause contrast and saturation to be lost in the image. As such, in one embodiment, saturation may likewise increase as exposure increases to compensate for lost color vibrancy. Of course, in other embodiments, any combination of filters may be used to optimize the resulting image.

As another example, in one embodiment, modifying a slider may adjust white balance, exposure, and color correction. In one embodiment, such modification may occur simultaneously. In one embodiment, a single slider may be used to control all three (or any number) of filters. In another embodiment, an option may be provided to separate the slider into three (or a corresponding number) sliders, each one for the specific filter (e.g. a slider for white balance, exposure, and color correction, etc.). In this manner, the end user may choose to apply a bundle of filters via one slider, or may have the option to fine tune each of the filters which were applied.

In one embodiment, the output may include more than one version (e.g. premium, free, etc.) corresponding with specific processing code (e.g. GL code, etc.). In another embodiment, the output may be specific to one version (e.g. premium, free, etc.) corresponding with specific processing code (e.g. GL code, etc.). In this manner, the output corresponding to a specific one version will be more lightweight (e.g. less data required, etc.) than a package including more than one version.

In one embodiment, the one or more images may be included in a dynamic image object (DIO) package. Of course, any functionality associated with a DIO may be included, utilizing the systems and methods disclose within application Ser. No. 14/503,210, filed Sep. 30, 2014, entitled "SYSTEMS, METHODS, AND COMPUTER PROGRAM PRODUCTS FOR DIGITAL PHOTOGRAPHY"; and application Ser. No. 14/503,224, filed Sep. 30, 2014, entitled "SYSTEMS, METHODS, AND COMPUTER PROGRAM PRODUCTS FOR DIGITAL PHOTOGRAPHY", the contents of each are herein incorporated by reference.

In various embodiments, the output may be self-contained. For example, in one embodiment, the package associated with the output may contain all of the processing code necessary to display and manipulate an image based on user feedback. In such an embodiment, the manipulation of an image does not require any interaction with a server (e.g. apart from providing the package, etc.), as all of the processing code may account for manipulation of the image.

Still yet, in one embodiment, applying a modification to the image (e.g. via a slider, etc.) may cause a modification to one or more elements that are used in processing code. For example, in one embodiment, modifying a slider may correspond with modifying a uniform which is used with GL code to generate a resulting image for display. In this manner, modifications to the image are requested directly to the processing code of the package without having to call a server.

In one embodiment, the one or more images may include at least some pre-evaluation application. For example, in one embodiment, a client device may use a preconfigured hardware element to correct a white balance and/or take any other action which may improve the one or more images. In this manner, the one or more images that are sent to the server (e.g. for storage, for evaluation, etc.) may reflect at least some pre-evaluation application. In other embodiments, it may be determined that evaluating (e.g. even by hardwired, etc.) may occur overall faster on a server, in which case, the client device may be used simply to capture and send without evaluating the one or more images. Of course, in other embodiments, any interaction between a client device and a server may be used to optimize the processing of the one or more images.

Additionally, in a further embodiment, the output may include a package of multiple images, the package referencing local URLs corresponding to the images, code for processing the one or more images, and/or any other relevant information (e.g. metadata, etc.) necessary to effectively modify the multiple images to create a final image. Further, the output may include a package referencing items both on a client device and in the package. For example, original images 1 and 2 may be stored on a client device, and image 3 may be the optimized generated image based on the original images 1 and 2. The output package may include image 3 (e.g. as created by the server, etc.) but not include images 1 and 2 if the output package is sent back to the user to manipulate the generated image. In such an embodiment, the user may manipulate the image, the manipulation referencing the original images 1 and 2 stored on the device, as well as image 3 which is included in the package (as provided by the server).

In this manner, the output package may reference one or more images, which may be stored at more than one storage location.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
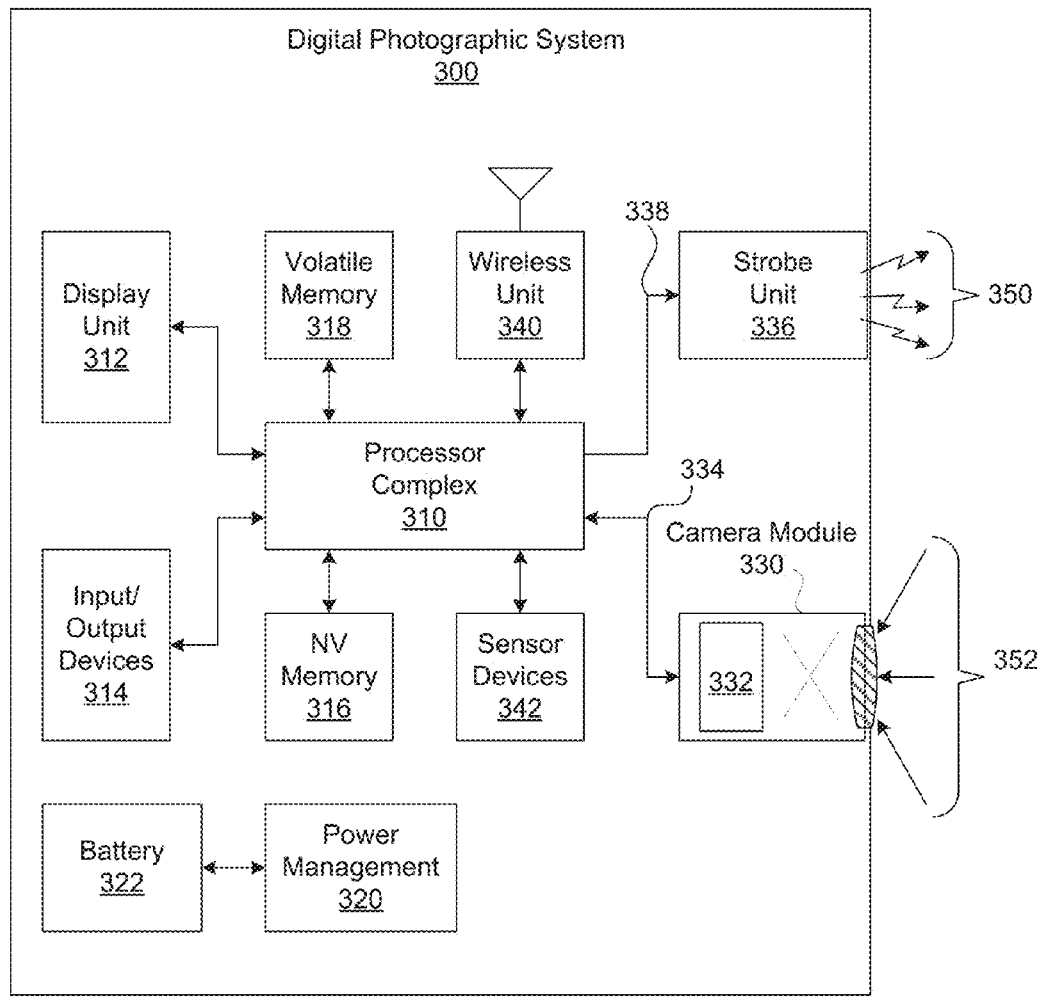
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image.

In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
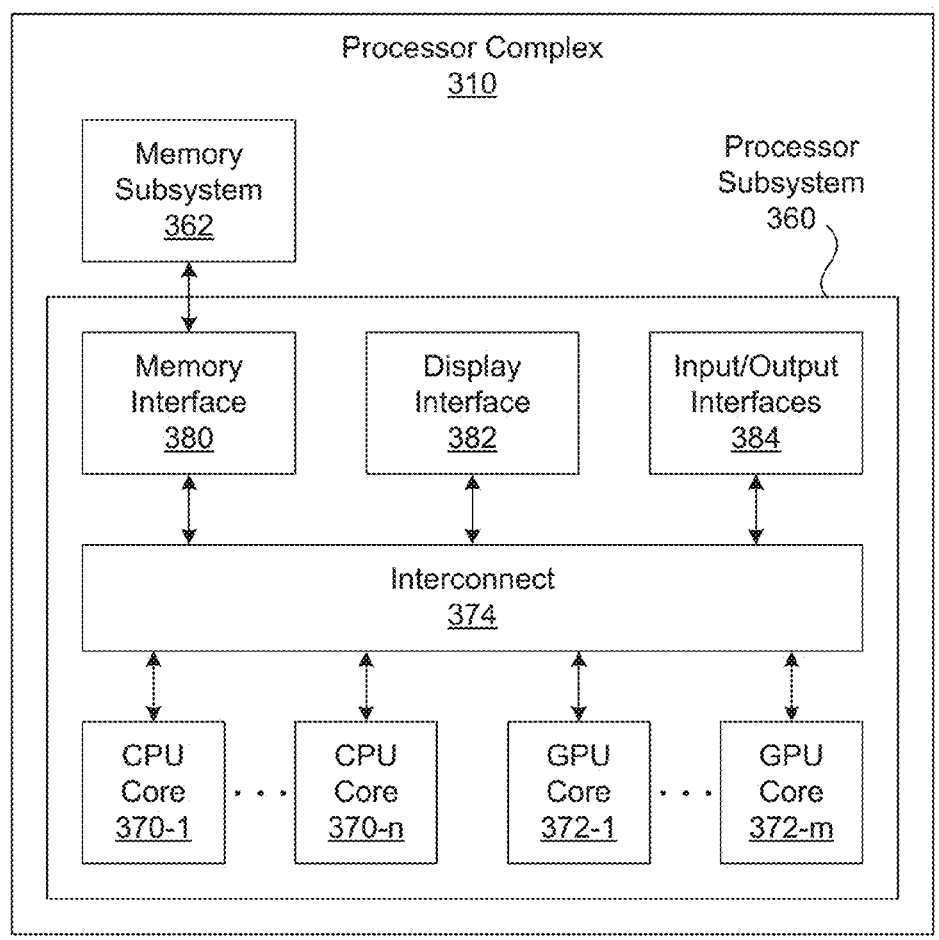
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
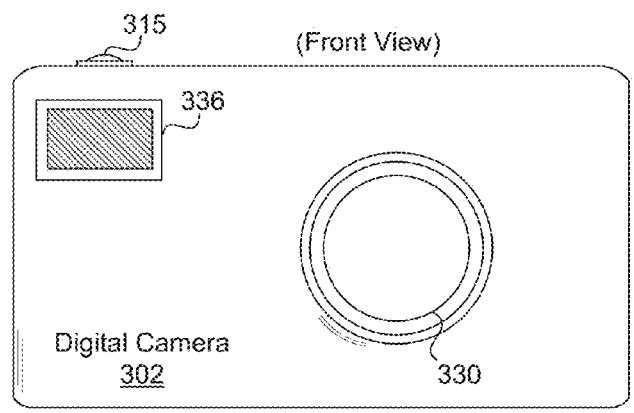
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
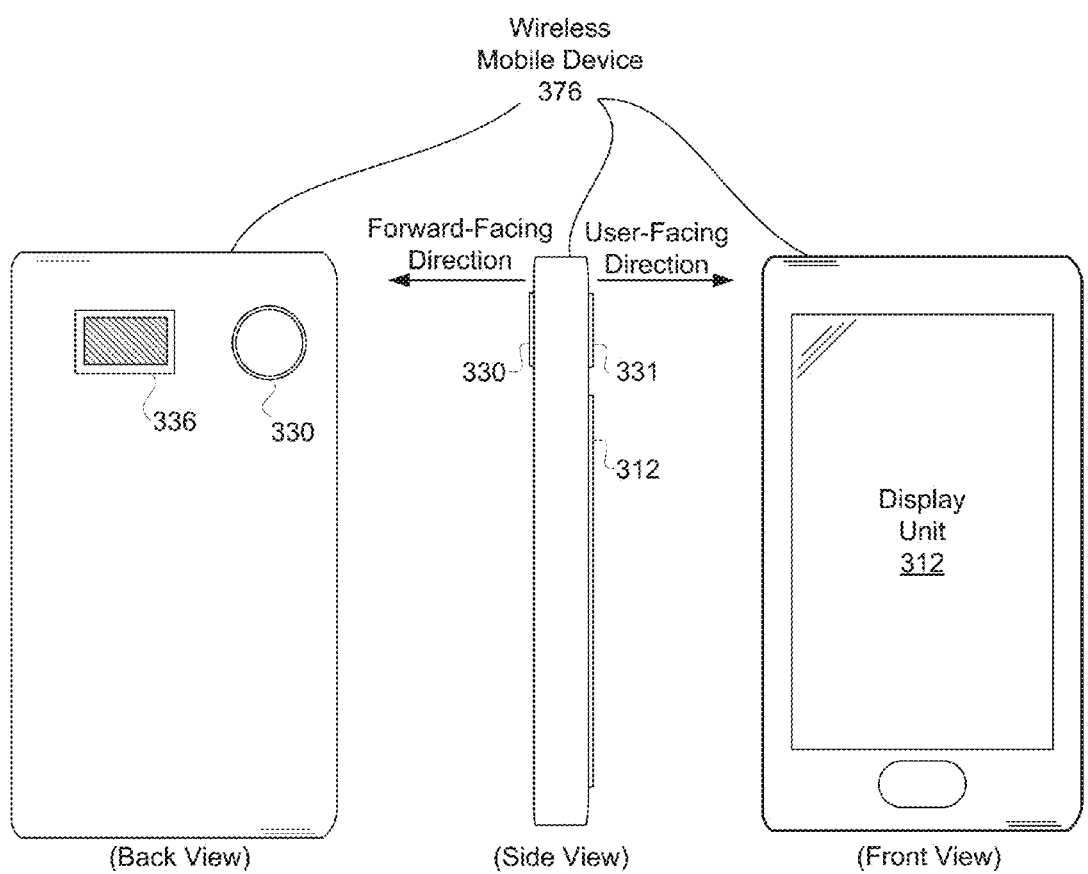
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
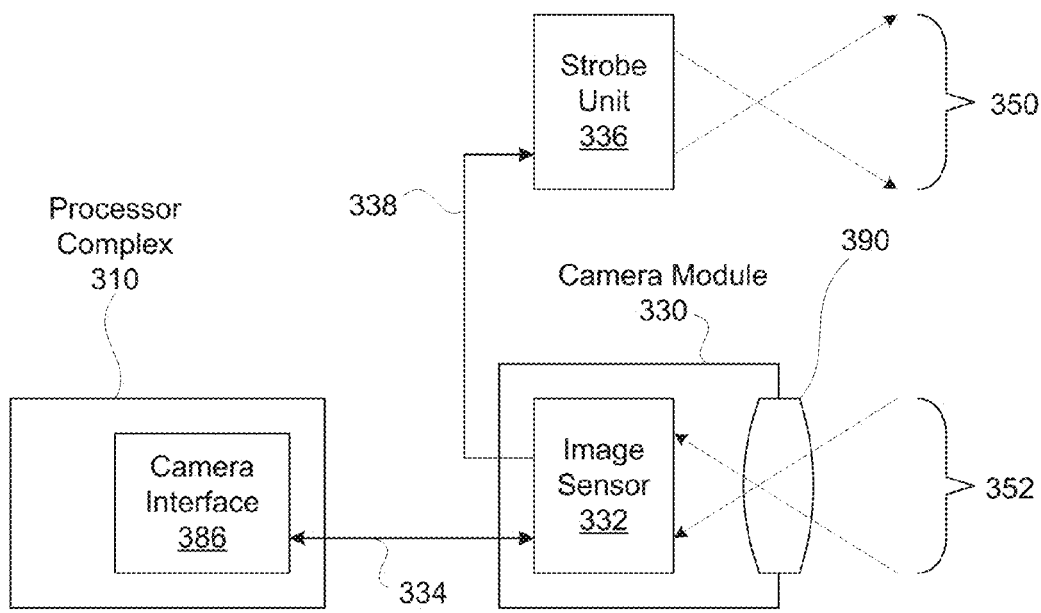
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled.

In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
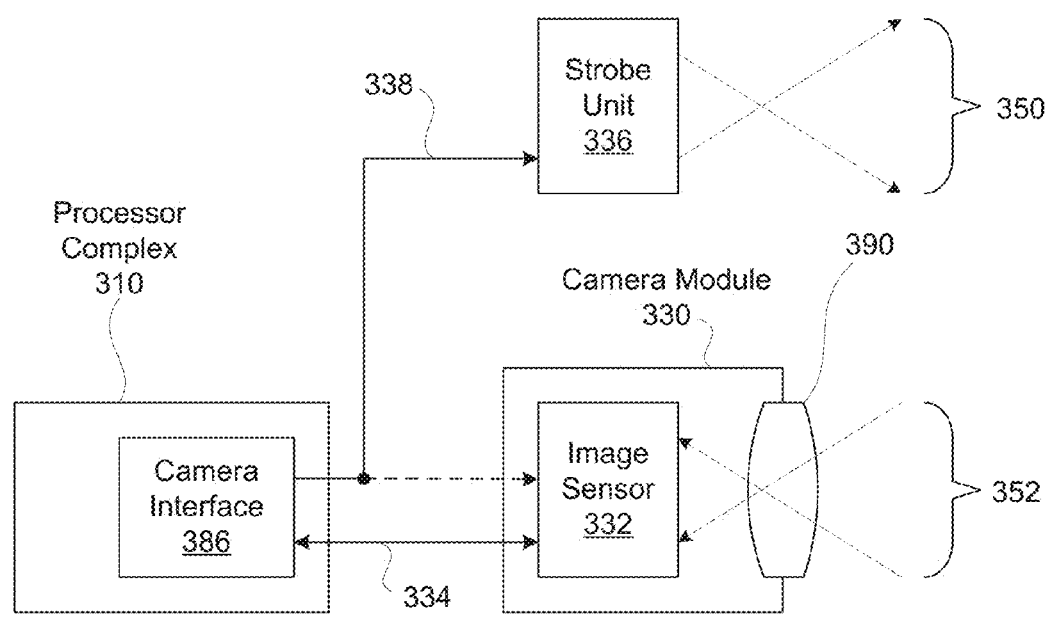
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
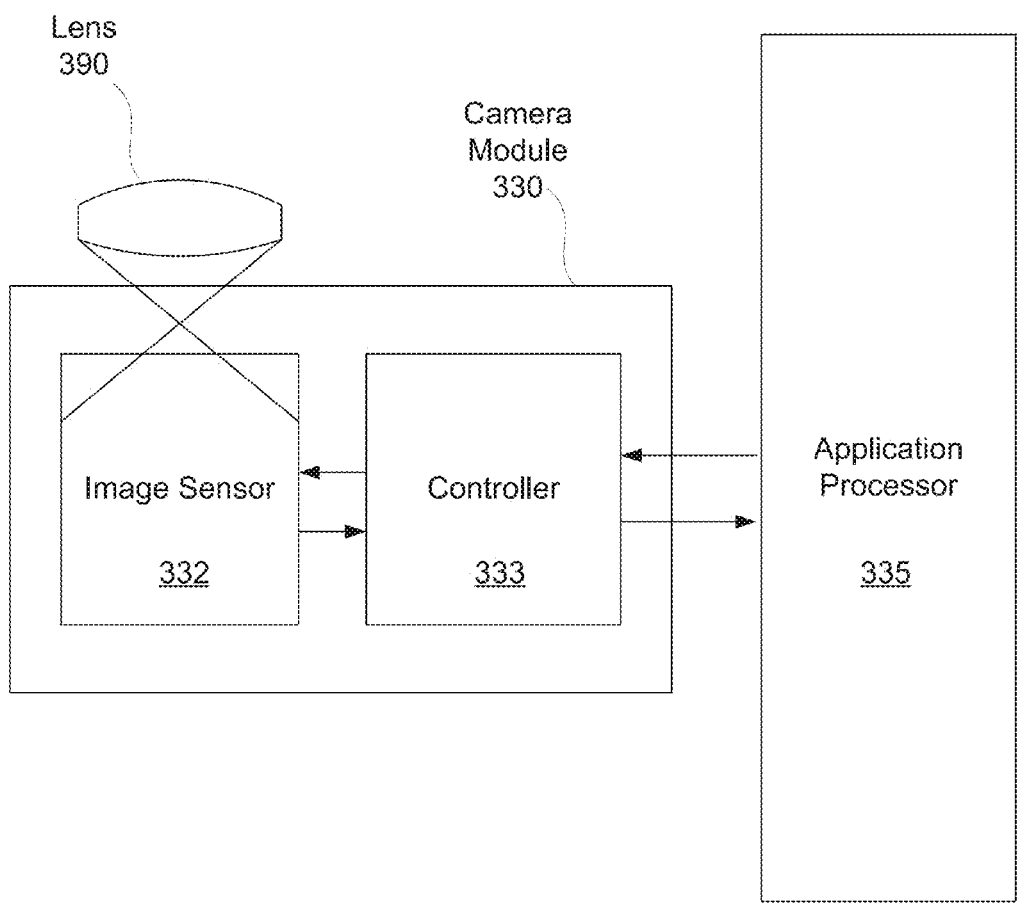
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment.

Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
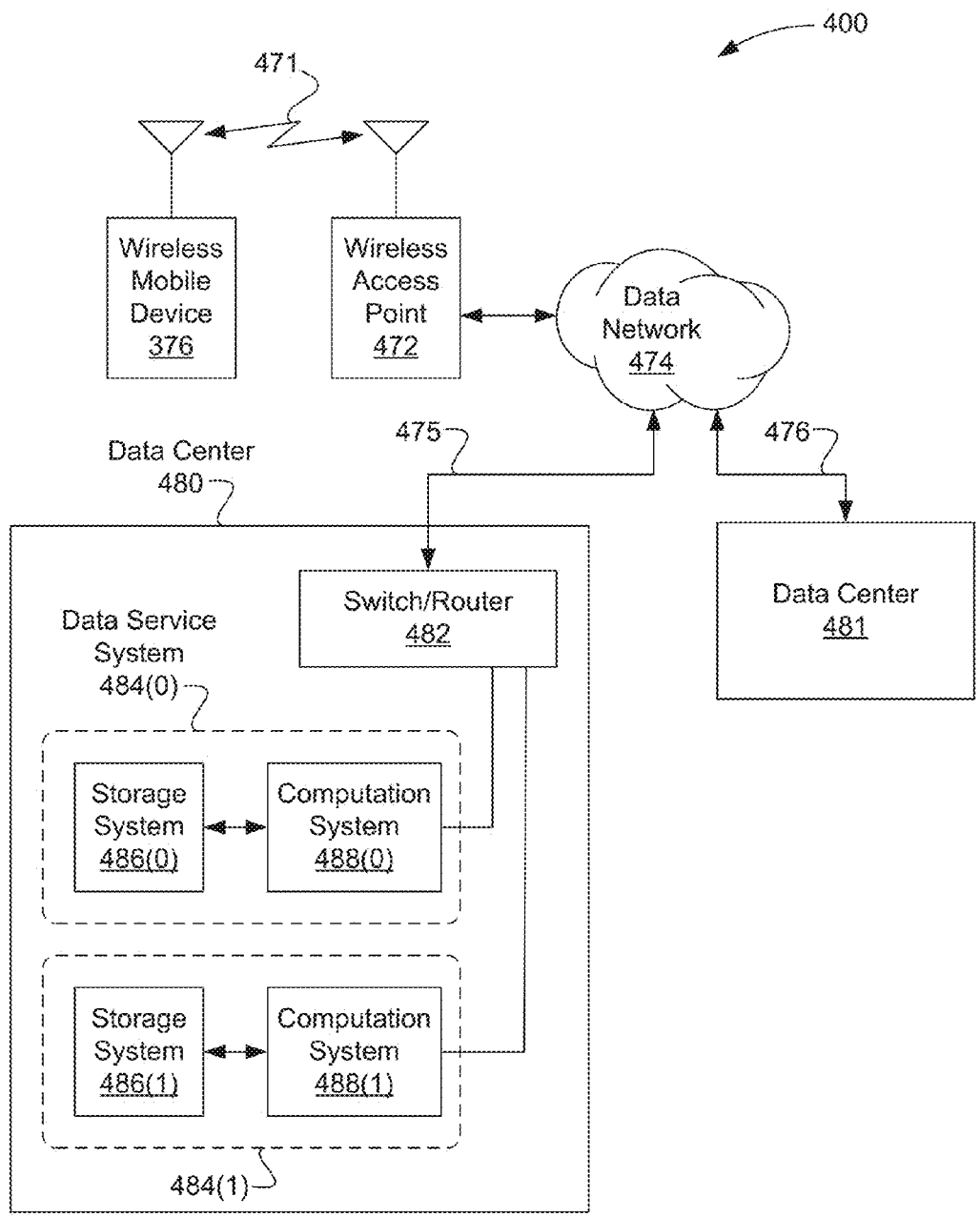
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5:
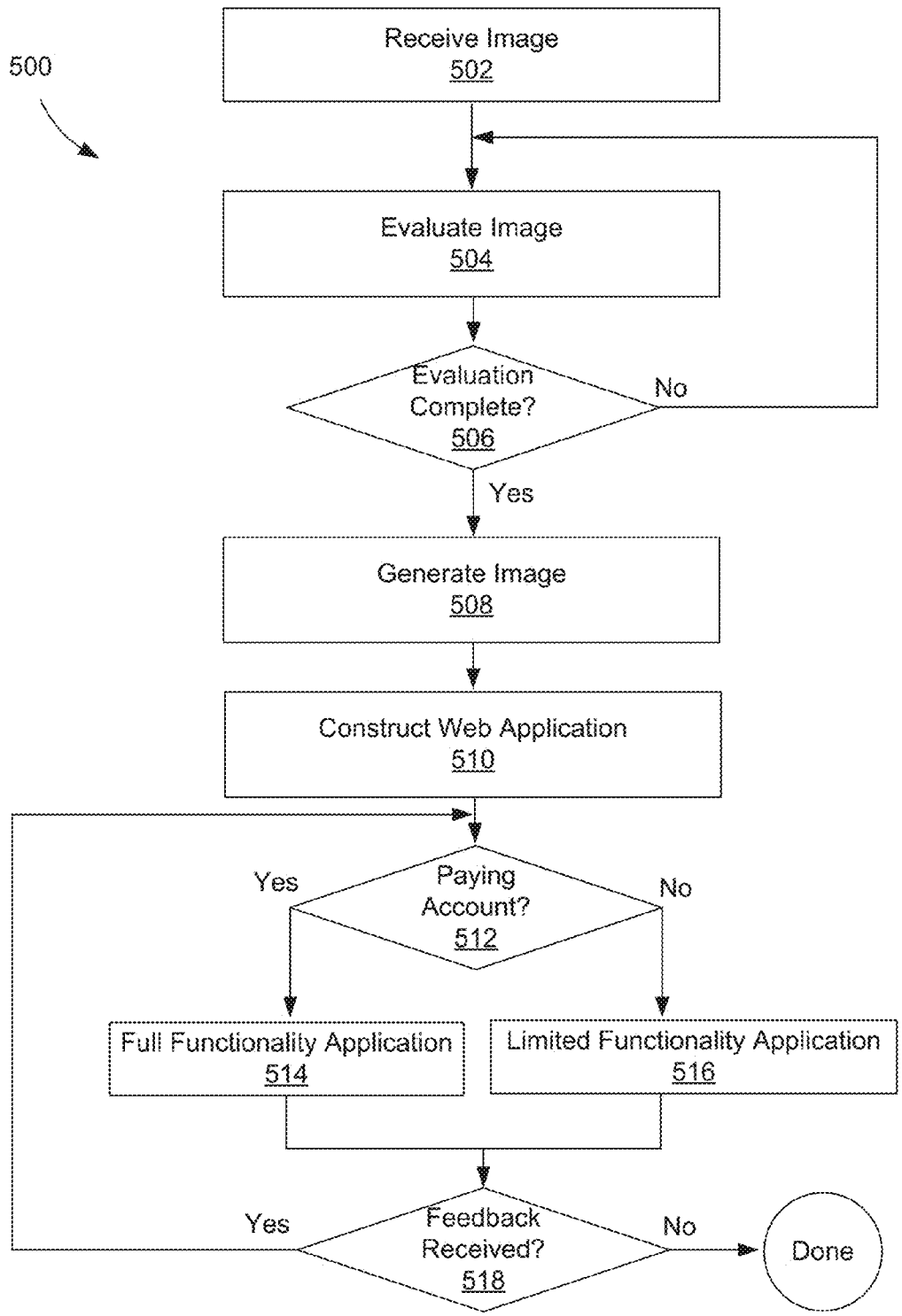
FIG. 5 illustrates a method for constructing a web application, in accordance with another embodiment.

FIG. 5 illustrates a method 500 for constructing a web application, in accordance with another embodiment. As an option, the method 500 may be implemented in the context of the details of any of the Figures disclosed herein. Of course, however, the method 500 may be implemented in any desired environment. Further, the aforementioned definitions may equally apply to the description below.

As shown, the method begins with receiving an image. See operation 502. As described hereinabove, the image may include one or more images, which may be received by a server. After being received, the one or more images may be evaluated. See operation 504.

In one embodiment, the evaluation may include generating processing code (e.g. GL code, GL object, WebGL object, etc.). In another embodiment, the evaluation may include forming a stack of images associated with processing code. For example, in one embodiment, a stack of images may include a series of EV-1, EV0, and EV+1 images which may be blended to form a HDR image. Additionally, the evaluation may include generating an image. As an example, the generating may include combining multiple images (e.g. creating an HDR, etc.). Additionally, the evaluation may include creating a specification and then generating processing code associated with the generated image. In one embodiment, the generated image may be manipulated based on the processing code (and/or created specification, etc.).

As shown, it is determined if the evaluation is complete. See decision 506. In one embodiment, an evaluation may proceed in steps, including for example, correcting a white balance, correcting a saturation, creating processing code, creating a blended image, and/or taking any series of actions. In a separate embodiment, an evaluation may proceed in a parallel fashion whereby each of the filters (e.g. white balance, saturation, etc.) and/or processing (e.g. create GL code, create blended image, etc.) may occur near simultaneously.

After completing the evaluation, an image may be generated. See operation 508. In one embodiment, the image may be generated at the conclusion of an evaluation step (e.g. after filters have been identified and applied, etc.). In another embodiment, the image may be generated as part of the evaluation step.

After an image is generated, a web application is constructed. See operation 510. In one embodiment, the web application may be created based on an output including a package, the package including a generated image, processing code (e.g. GL code, etc.), and/or any other data necessary to independently control and modify the generated image. In one embodiment, the package may include a web application.

In one embodiment, multiple versions or a specific version based on a user account type of a web application may be created prior to outputting a package. For example, in one embodiment, a premium (paid) version and/or a free version web application may be created, but the output package may include one and/or both of the versions, depending on the intended recipient.

For example, as shown, after constructing a web application, it is determined whether there is a paying account. See decision 512. In one embodiment, if it is a paying account, a full functionality application may be provided. See operation 514. In another embodiment, if an account is not a paying account, then a limited functionality application may be provided. See operation 516. Further, it is determined whether feedback is received. See decision 518.

In one embodiment, a first feedback may be associated with a full functionality application and a second feedback may be associated with a limited functionality application. For example, in one embodiment, the first feedback may include one or more modifications made to one or more features. In another embodiment, the second feedback may include one or more modifications made to a single feature.

For example, in various embodiments, the first feedback may be comprised of multiple settings, including a modification made to a filter (e.g. white balance, saturation, etc.), to processing (e.g. GL code, blending of two or more images, etc.), to the selected images (e.g. used as the basis for blending, etc.), and/or any other modification. In one embodiment, the first feedback may include a first modification and a second modification, the first modification and second modification being received simultaneously and/or at a separate time. For example, in one embodiment, a first modification may be received at a first time and a second modification may be received at a second time, wherein the first time and the second time are different times. Additionally, the first modification may include a set of modifications and the second modification may include a set of modifications.

As shown, if feedback is received, then the modification(s) are displayed on the full functionality application or the limited functionality application, depending on whether the web application is associated with a paying account. In one embodiment, the web application may include processing code necessary to implement the changes received via the feedback. In another embodiment, the feedback may be sent to a server to generate an image, and reconstruct a web application. In such an embodiment, it may be necessary to send such feedback to a server in the event that, for example, a custom setting or a new filter is created by the user. In other embodiments, however, if a new filter or custom filter is not created, then the processing code contained in the web application may contain all of the code necessary to implement the one or more modifications inputted by the user.

Figure 6:
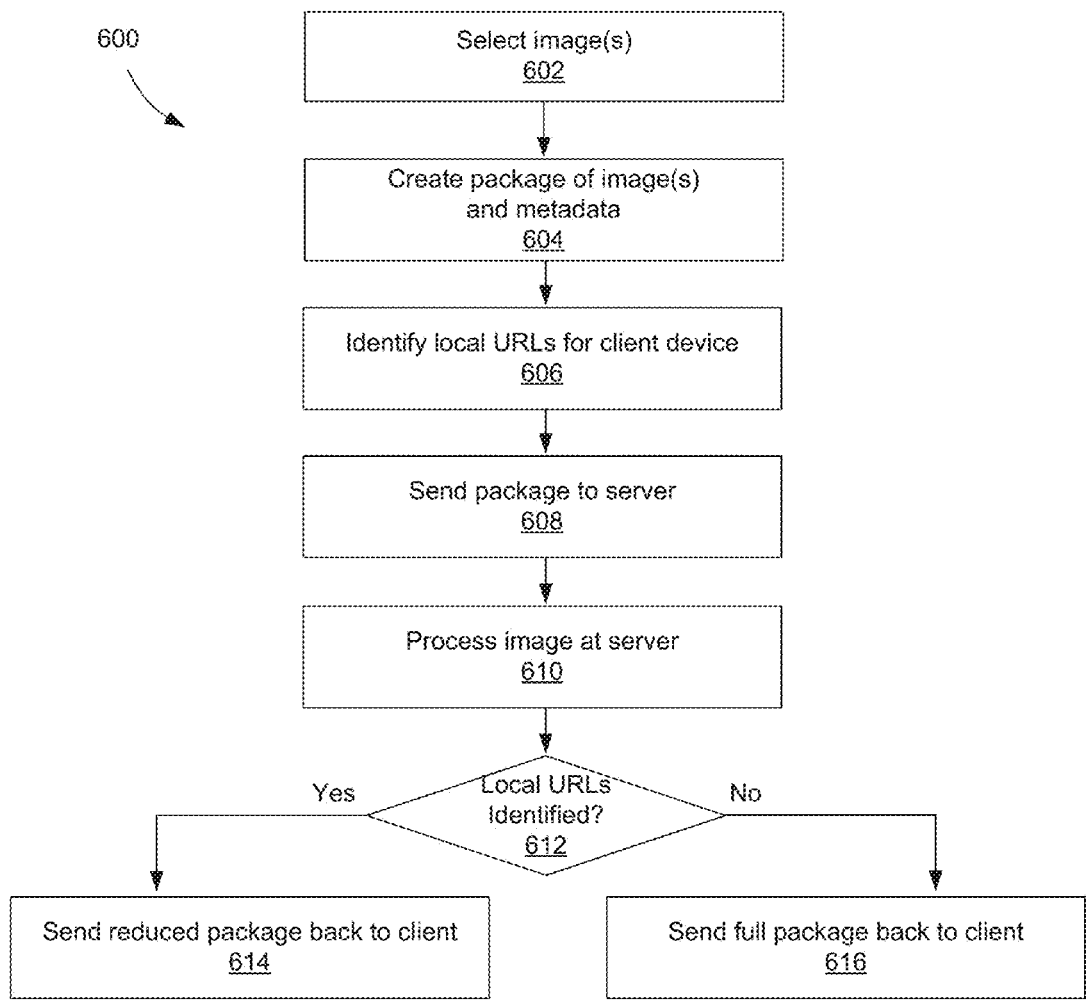
FIG. 6 illustrates a method for exchanging images, in accordance with another embodiment.

FIG. 6 illustrates a method 600 for exchanging images, in accordance with another embodiment. As an option, the method 600 may be implemented in the context of the details of any of the Figures disclosed herein. Of course, however, the method 600 may be implemented in any desired environment. Further, the aforementioned definitions may equally apply to the description below.

As shown, one or more images are selected. See operation 602. Additionally, a package of the one or more images and metadata is created. See operation 604. Local URLs for the client device are identified. See operation 606. Further, the package is sent from the client device to the server. See operation 608.

In one embodiment, the selection of the one or more images may occur manually. For example, in one embodiment, after capturing a number of images, a user may select all or a subset of the captured images. In another embodiment, the selection of the one or more images may occur automatically. For example, in one embodiment, after capturing a single image, the image may be automatically packaged and sent to a server for processing. In another embodiment, the package may be sent once a threshold is reached (e.g. a minimum of five photos, a set number of photos within a specified time frame, etc.).

In various embodiments, local URLs may be identified once the package is created. For example, before sending the package to a server, the device may analyze the contents of the package and provide a local URL for any resource (e.g. photo, metadata, data, etc.) being transferred. In a separate embodiment, local URLs may be already associated with the one or more images and/or metadata. For example, in one embodiment, when one or more images are selected, the selection may inherently include an address to the one or more images (e.g. sdcard/DCIM/images/image001.jpg, etc.). In such an embodiment, the address associated with the location of the image to be uploaded may be used as an identification (included in the package) of a local URL. For example, when a hypothetical image 01 is selected on client device X, the address of the location where the image is stored is first determined. Such a location may be included in the package which is subsequently sent to a server for processing. The server may identify which assets are stored locally on client device X.

As shown, the one or more images are processed at the server. See operation 610. In one embodiment, the processing at the server may be analogous to evaluating image in operation 504. The processing may analyze the one or more images, the associated metadata, and/or any other data which is contained in the sent package. In one embodiment, the processing may include enhancing the image in some manner (e.g. correct white balance, fix contrast, etc.). In other embodiments, the processing may include blending two or more photos (e.g. mix an ambient photo and a flash photo, etc.), creating a new generated image (e.g. based off of enhancing and/or any other action, etc.), and/or taking any other action with respect to the sent package.

As shown, after processing the one or more images at the server (and any other data sent), it is determined whether local URLs are identified. See decision 612. In various embodiments, local URLs may be previously identified and sent by the client device. In other embodiments, local URLs may be assigned by a server. For example, in one embodiment, the server may identify a first client device as the source of the sent one or more images. In such an embodiment, the server may identify the location (e.g. on the storage medium) of the one or more images, and/or may identify simply the source (e.g. the device, etc.).

In one embodiment, if the server identifies the source and not the full location, the local URL may be incomplete (e.g. the full address to the resource may not be identified, etc.). In such an embodiment, when sending the modified package back to the client, the server may request whether the resources initially sent can be located on the client device. If so, then the server may not include such one or more images. In the event, however, that the client device cannot locate the one or more images, then the server may send the one or more images back to the client device.

As shown, if local URLs are identified, then a reduced package is sent back to the client. See operation 614. Additionally, if local URLs are not identified, then a full package is sent back to the client. See operation 616.

In one embodiment, a reduced package may include any data less than a full package, the full package containing all images, metadata, code (e.g. GL, etc.) necessary to enable an independent web application. In another embodiment, a reduced package may not include those resources (e.g. images, etc.) for which a local URL was identified. In some embodiments, a reduced package may include a full package but at a lower overall data amount. For example, in one embodiment, the one or more images may be compressed in some manner to minimize data exchange. In such an embodiment, the client web application may use lower resolution photos to manipulate the photo. After manipulating the photos via the web application, the instructions as dictated by the user may be sent back to the server to create a full resolution generated image. Such a full resolution generated image may then be returned to the client (e.g. via email, via an application, via a cloud storage service, etc.).

In the context of the present description, a local URL may include any reference to a resource stored on a local device. In one embodiment, a local URL may refer to the storage location of an image. Additionally, a local URL may refer to an object that resides within the mobile device, such as within a local file system associated with the mobile device.

Figure 7:
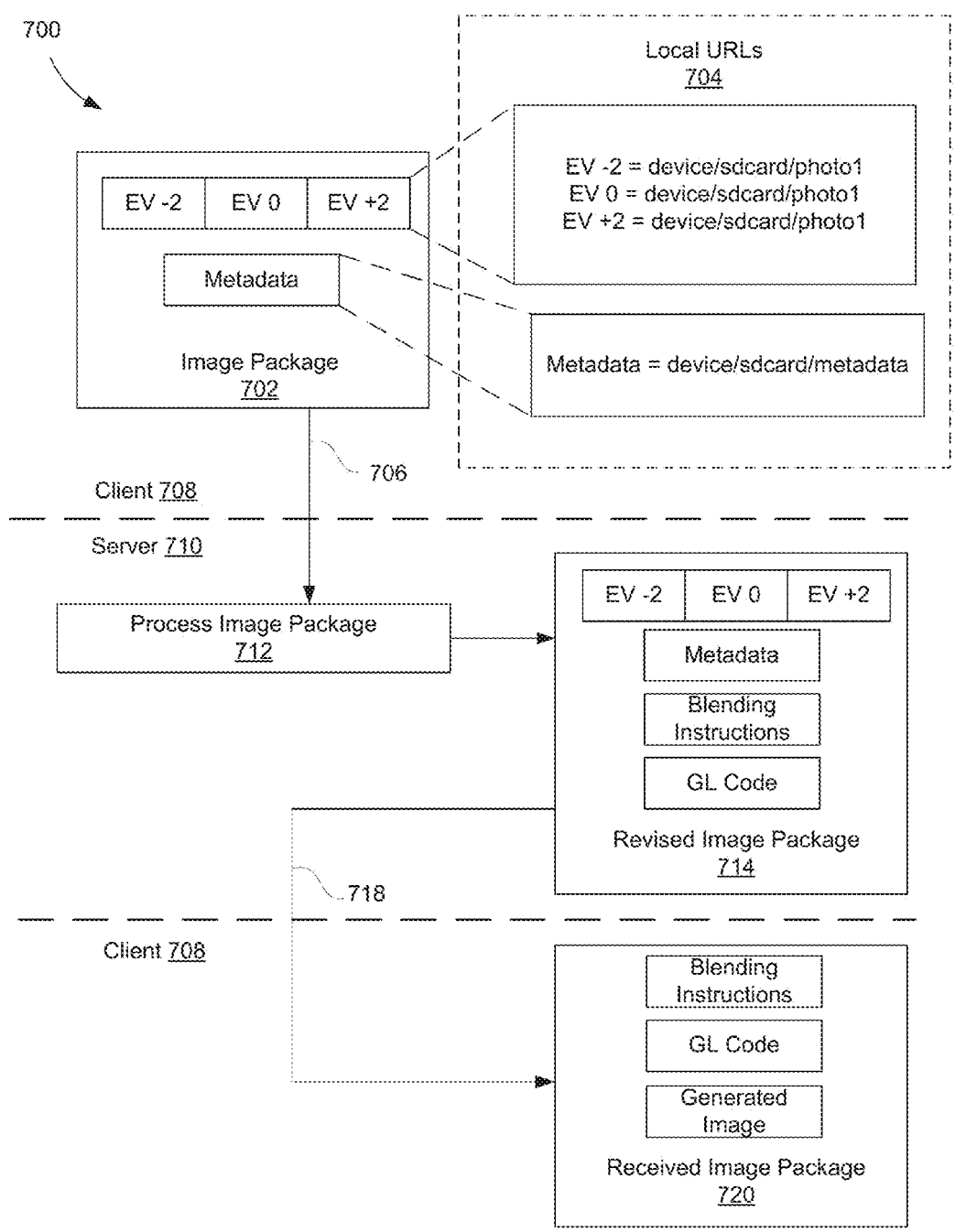
FIG. 7 illustrates a method for exchanging images, in accordance with another embodiment.

FIG. 7 illustrates a method 700 for exchanging images, in accordance with another embodiment. As an option, the method 700 may be carried out in the context of the details of any of the Figures disclosed herein. Of course, however, the method 700 may be carried out in any desired environment. Further, the aforementioned definitions may equally apply to the description below.

As shown, a client 708 may include a package 702. In one embodiment, the package 702 may include one or more images (e.g. EV-2, EV0, EV+2, etc.), metadata associated with the one or more images, metadata associated with the device (e.g. camera, mobile device, etc.), and/or any other pertinent data relating to the one or more images. In various embodiments, the package may include local URLs 704 which may provide a location for any of the resources (e.g. one or more images, metadata, etc.). The package is then sent 706 from a client 708 to a server 710.

In one embodiment, the package may be processed 712 which may include evaluating one or more images, metadata, and/or any of the data which is sent from the client device. In another embodiment, the processing may include taking an action (e.g. blend two or more images, enhance the one or more images, etc.).

As shown, a revised image package 714 may be created. In one embodiment, the revised image package may include blending instructions, code (e.g. GL code, etc.), a generated image (e.g. based on the one or more images, etc.), data necessary for a web application (e.g. full functionality web application, limited functionality web application, etc.), and/or any other information which may be associated with the one or more images.

In one embodiment, more than one revised package may be created or different revised packages may be created based on the original image package 702. For example, a revised package may be created for a limited functionality application, for a full functionality application, for a client which has one or more resources (e.g. local URLs, images, metadata, etc.), for a mobile-version web application, for a desktop-version web application, for a reduced size package, and/or any combination of the foregoing. As such, in some embodiments, multiple versions of an image package may be created. In some embodiments, the version of the revised image package created may depend on the intended destination. For example, in one embodiment, the end destination may include a user which pays for a premium service for access to more or all of the functions and controls of the web application. In such an embodiment, a revised image package may be created such that the end destination has full access to the functions and controls of the web application. Of course, in other embodiments, any type of revised image package may be created which may be associated with the intended destination in some manner.

As shown, the revised image package may be sent 718 from the server 710 to the client 708. Additionally, the received image package 720 may be received from the server.

In one embodiment, the received image package may not include those resources which are already provided for on the client device. For example, in various embodiments, a client device may include one or more images as well as associated metadata. As such, when the received image package is received from the server, the package may not include such resources, but only include those items which were not previously found on the client device. For example, one or more objects, resources, and/or code may have originated on the server device, and therefore would not be found on the original client device. As such, the revised image package may include those items which originated from the server device and which did not originally come from the client device. Of course, in other embodiments, the revised image package may include objects from any location (e.g. server, client, etc.).

In some embodiments, the received image package may be sent on a temporary basis to the client device. For example, in one embodiment, the received image package may be sent to the client for approval, after which the received image package may be publicly released. In other embodiments, an action may be taken (e.g. generate full resolution combined image, etc.), a full feature web application may be released (e.g. in response to being approve for premium features, etc.), and/or any other action may be taken in response to receiving feedback (e.g. approval, etc.) from the client.

Figure 8:
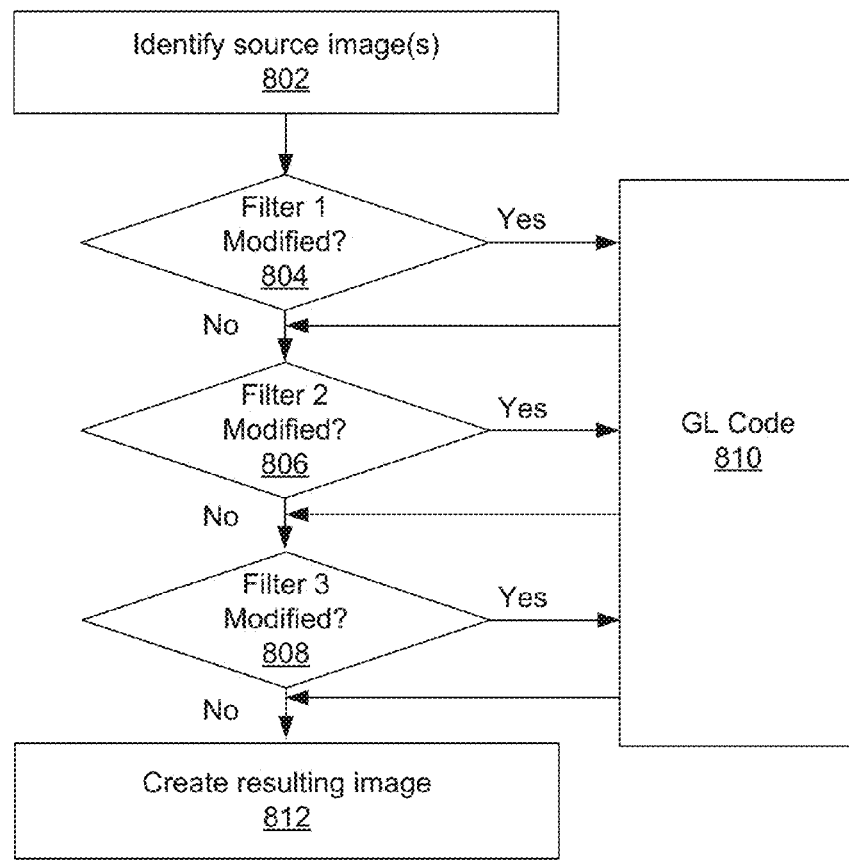
FIG. 8 illustrates a method for determining whether a filter is to be included in a pipeline, in accordance with another embodiment.

FIG. 8 illustrates a method 800 for determining whether a filter is to be included in a pipeline, in accordance with another embodiment. As an option, the method 800 may be implemented in the context of the details of any of the Figures disclosed herein. Of course, however, the method 800 may be implemented in any desired environment. Further, the aforementioned definitions may equally apply to the description below.

As shown, a method 800 may include identifying one or more source images. See operation 802. It is then determined whether filter 1 is modified, whether filter 2 is modified, and/or whether filer 3 is modified. See decisions 804, 806, 808. If it is determined that filter 1, filter 2, and/or filter 3 has been modified, then the input is sent to GL code. See object 810. Further, after input from GL Code has concluded, or if no filter is modified, then a resulting image is created. See operation 812.

In various embodiments, the image package 814 may be independent of other resources, such that when one or more inputs are received (e.g. a modification to filter 1, filter 2, filter 3, etc.), the image package can receive such inputs and provide an output without having to fetch and/or retrieve data or code from another source.

In some embodiments, filter 1, filter 2, filter 3, and/or any number of filters may relate to color modification and mapping (e.g., white balance, saturation, color selection, hue mapping, etc.), exposure, contrast, general level mapping, any sampling kernel filter, any mixing filter (e.g., of two or more input images), and/or any other parameter associated with an image.

In other embodiments, an application (e.g. web application, etc.) may dictate what parameters should be applied for the filters. In one embodiment, a filter may be comprised of multiple parameters (e.g. white balance, exposure, warmth, etc.) wherein modification to one filter value may modify multiple parameters. In another embodiment, a filter may include a dehazing and/or a blurring operation.

In one embodiment, the image package 814 may be provided by a server to run locally on a client device. For example, in one embodiment, the GL code included in the image package may provide the functionality such that inputs may be received, modifications to the one or more images may occur (e.g. based on the inputs, etc.), and/or a resulting image may be created.

Figure 9:
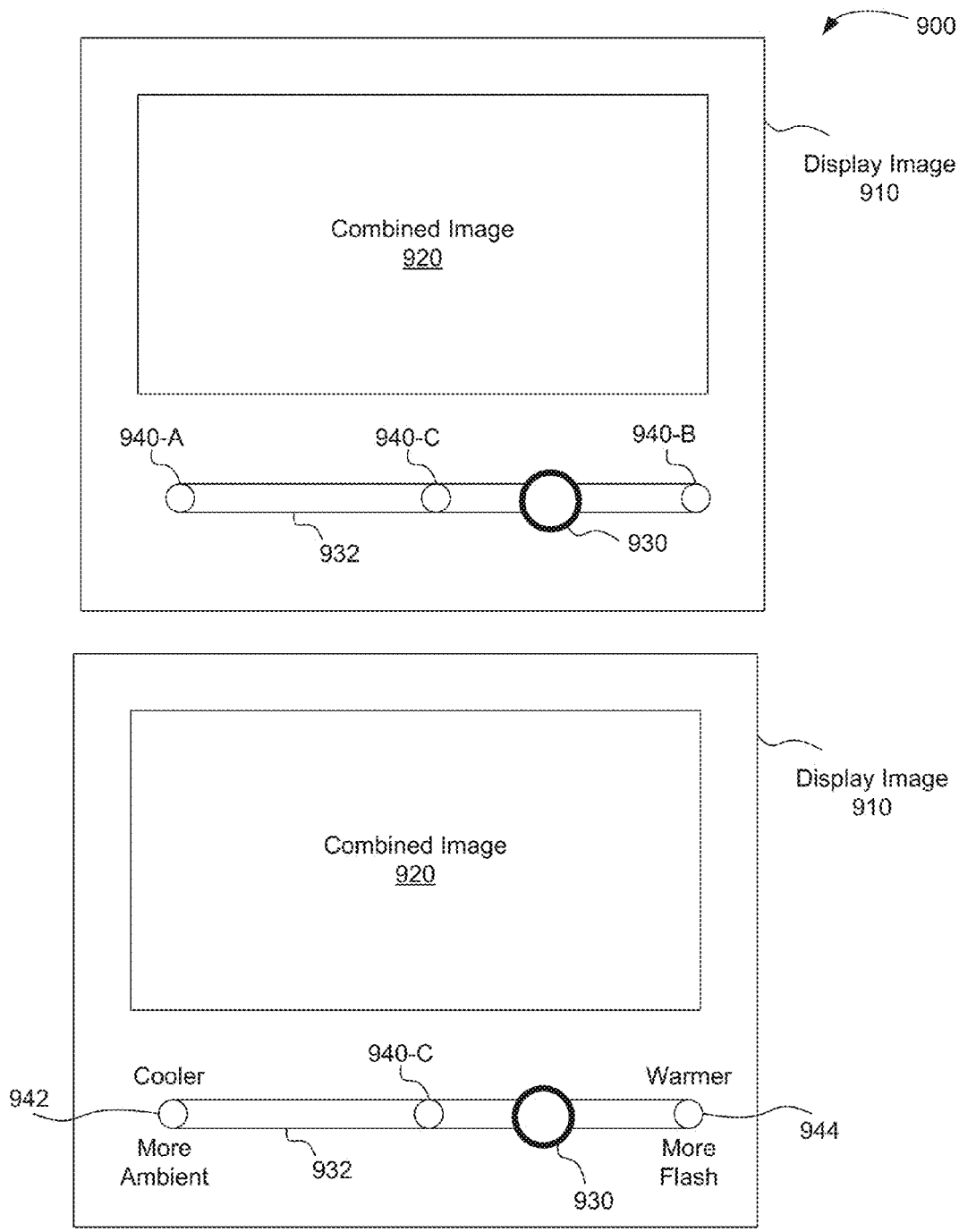
FIG. 9 illustrates a user interface (UI) system for generating a combined image, according to one embodiment of the present invention

FIG. 9 illustrates a user interface (UI) system 900 for generating a combined image 920, according to one embodiment of the present invention. As an option, the UI system 900 may be implemented in the context of the details of any of the Figures disclosed herein. Of course, however, the UI system 900 may be carried out in any desired environment. Further, the aforementioned definitions may equally apply to the description below.

In one embodiment, a combined image 920 comprises a combination of at least two related digital images. In one embodiment, the combined image 920 comprises, without limitation, a combined rendering of a first digital image and a second digital image. In another embodiment, the digital images used to compute the combined image 920 may be generated by amplifying an analog signal with at least two different gains, where the analog signal includes optical scene information captured based on an optical image focused on an image sensor. In yet another embodiment, the analog signal may be amplified using the at least two different gains on a pixel-by-pixel, line-by-line, or frame-by-frame basis.

In one embodiment, the UI system 900 presents a display image 910 that includes, without limitation, a combined image 920, a slider control 930 configured to move along track 932, and two or more indication points 940, which may each include a visual marker displayed within display image 910.

In one embodiment, the UI system 900 is generated by an adjustment tool executing within a processor complex 310 of a digital photographic system 300, and the display image 910 is displayed on display unit 312. In one embodiment, at least two digital images, such as the at least two related digital images, comprise source images for generating the combined image 920. The at least two digital images may reside within NV memory 316, volatile memory 318, memory subsystem 362, or any combination thereof. In another embodiment, the UI system 900 is generated by an adjustment tool executing within a computer system, such as a laptop computer or a desktop computer. The at least two digital images may be transmitted to the computer system or may be generated by an attached camera device. In yet another embodiment, the UI system 900 may be generated by a cloud-based server computer system, which may download the at least two digital images to a client browser, which may execute combining operations described below. In another embodiment, the UI system 900 is generated by a cloud-based server computer system, which receives the at least two digital images from a digital photographic system in a mobile device, and which may execute the combining operations described below in conjunction with generating combined image 920.

The slider control 930 may be configured to move between two end points corresponding to indication points 940-A and 940-B. One or more indication points, such as indication point 940-C may be positioned between the two end points. Each indication point 940 may be associated with a specific version of combined image 920, or a specific combination of the at least two digital images. In one embodiment, when the slider control 930 is positioned directly over the indication point 940-A, only the first digital image may be displayed as the combined image 920 in the display image 910, and similarly when the slider control 930 is positioned directly over the indication point 940-B, only the second digital image may be displayed as the combined image 920 in the display image 910.

In one embodiment, indication point 940-C may be associated with a blending of the first digital image and the second digital image. For example, when the slider control 930 is positioned at the indication point 940-C, the combined image 920 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 920 or used to generate combined image 920. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 930 is positioned at the indication point 940-A, the first digital image is displayed as the combined image 920, and when the slider control 930 is positioned at the indication point 940-B, the second digital image is displayed as the combined image 920; furthermore, when slider control 930 is positioned at indication point 940-C, a blended image is displayed as the combined image 920. In such an embodiment, when the slider control 930 is positioned between the indication point 940-A and the indication point 940-B, a mix (e.g. blend) weight may be calculated for the first digital image and the second digital image. For the first digital image, the mix weight may be calculated as having a value of 0.0 when the slider control 930 is at indication point 940-B and a value of 1.0 when slider control 930 is at indication point 940-A, with a range of mix weight values between 0.0 and 1.0 located between the indication points 940-B and 940-A, respectively. Referencing the mix operation, the mix weight may be calculated as having a value of 0.0 when the slider control 930 is at indication point 940-A and a value of 1.0 when slider control 930 is at indication point 940-B, with a range of mix weight values between 0.0 and 1.0 located between the indication points 940-A and 940-B, respectively.

In one embodiment, a mix operation may be applied to the first digital image and the second digital image based upon at least one mix weight value associated with at least one of the first digital image and the second digital image. In one embodiment, a mix weight of 1.0 gives complete mix weight to the digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

This system of mix weights and mix operations provides a UI tool for viewing the first digital image, the second digital image, and a blended image as a gradual progression from the first digital image to the second digital image. In one embodiment, a user may save a combined image 920 corresponding to an arbitrary position of the slider control 930. The adjustment tool implementing the UI system 900 may receive a command to save the combined image 920 via any technically feasible gesture or technique. For example, the adjustment tool may be configured to save the combined image 920 when a user gestures within the area occupied by combined image 920. Alternatively, the adjustment tool may save the combined image 920 when a user presses, but does not otherwise move the slider control 930. In another implementation, the adjustment tool may save the combined image 920 when a user gestures, such as by pressing a UI element (not shown), such as a save button, dedicated to receive a save command.

To this end, a slider control may be used to determine a contribution of two or more digital images to generate a final computed image, such as combined image 920. Persons skilled in the art will recognize that the above system of mix weights and mix operations may be generalized to include two or more indication points, associated with two or more related images without departing the scope and spirit of the present invention. Such related images may comprise, without limitation, any number of digital images that have been generated using a same analog signal to have different brightness values, which may have zero interframe time.

Furthermore, a different continuous position UI control, such as a rotating knob, may be implemented rather than the slider 930 to provide mix weight input or color adjustment input from the user.

Of course, in other embodiments, other user interfaces may be used to receive input relating to selecting one or more points of interest (e.g. for focus, for metering, etc.), adjusting one or more parameters associated with the image (e.g. white balance, saturation, exposure, etc.), and/or any other input which may affect the image in some manner.

As shown, in a particular embodiment, the UI System 900 may include an indication point for cooler/more ambient 942 and/or warmer/more flash 944. Of course, one or more indication points may be used for any parameter.

In one embodiment, the cooler/more ambient indication point 942 may control an exposure value, a white balance, a warmth (e.g. temperature, etc.), a blending priority for the ambient photo, etc. In other embodiments, the warmer, more flash indication point 944 may control an exposure value, a white balance, a warmth (e.g. temperature, etc.) a blending priority for the flash photo, etc. Of course, in one embodiment, any combination of parameters may be used and/or controlled by a single indication point.

In another embodiment, an indication point may include one or more parameters. Still yet, in one embodiment, an advanced user may expand the slider to display each parameter associated with the indication point. For example, in one embodiment, a slider may be expanded to display an individual slider associated with each parameter related to the indication point. For example, in one embodiment, an indication point may control, in combination, an exposure value, a white balance, a warmth, and a blending priority. In one embodiment, such parameters may be expanded such that an individual slider may be displayed for each of an exposure value, a white balance, a warmth, and a blending priority. In this manner, an advanced user may have fine-grain control over how parameters are implemented. Nonetheless, in some embodiments, the default settings associated with the indication (having the parameters in combination, etc.) may be associated with optimized settings (e.g. based on the type of photos, camera, date, time, etc.).

Figure 10:
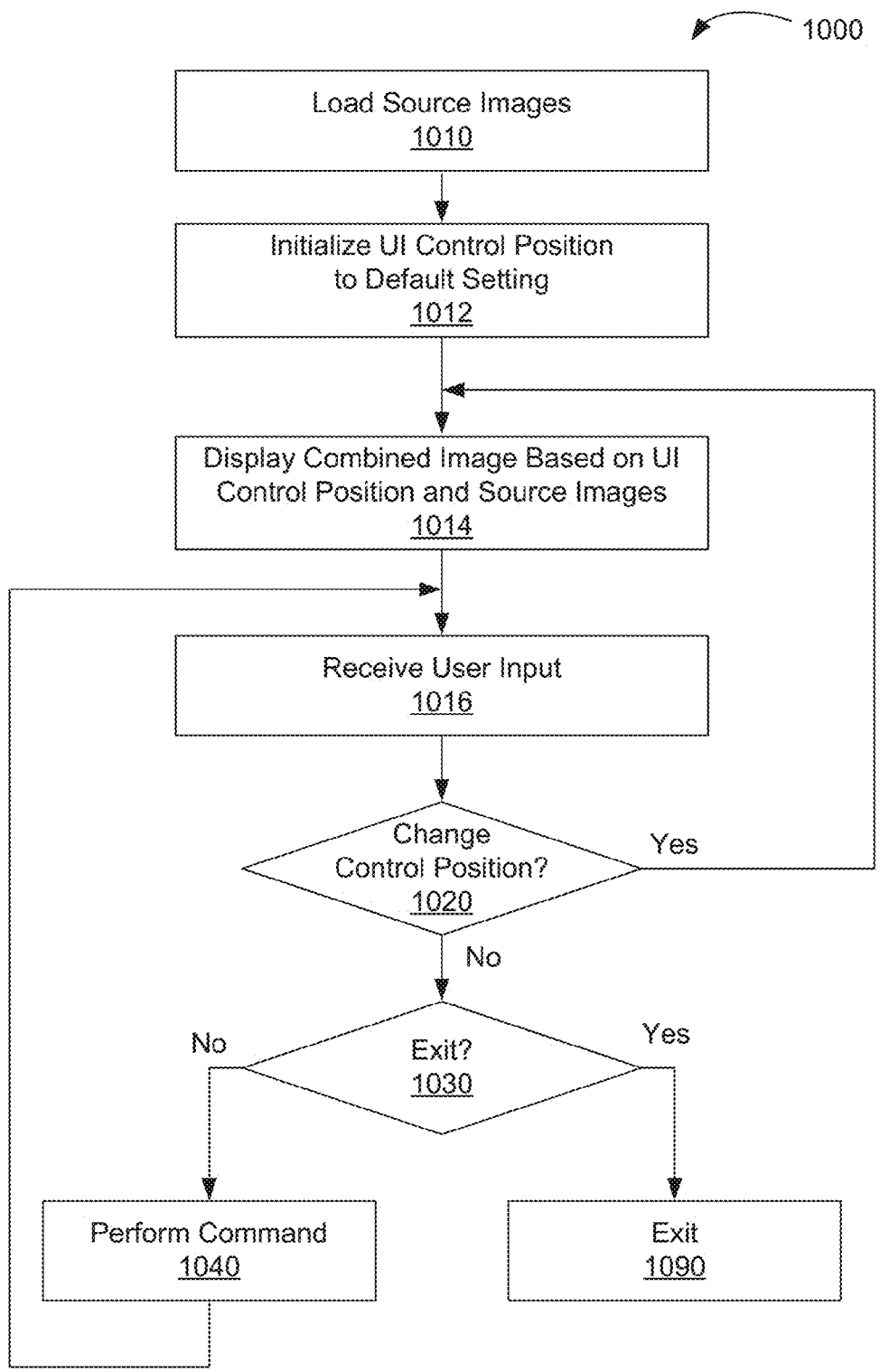
FIG. 10 is a method for generating a combined image, according to one embodiment of the present invention.

FIG. 10 is a method 1000 for generating a combined image, according to one embodiment of the present invention. As an option, the method 1000 may be carried out in the context of the details of any of the Figures disclosed herein. Of course, however, the method 1000 may be carried out in any desired environment. Further, the aforementioned definitions may equally apply to the description below.

The method 1000 begins in step 1010, where an adjustment tool executing within a processor complex, such as processor complex 310, loads at least two related source images, such as the first digital image and the second digital image described in the context of FIG. 9. In step 1012, the adjustment tool initializes a position for a UI control, such as slider control 930 of FIG. 9, to a default setting. In one embodiment, the default setting comprises an end point, such as indication point 940-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 1014, the adjustment tool generates and displays a combined image, such as combined image 920 of FIG. 9, based on a position of the UI control and the at least two related source images. In one embodiment, generating the combined image comprises mixing the at least two related source images as described previously in FIG. 9. In step 1016, the adjustment tool receives user input. The user input may include, without limitation, a UI gesture such as a selection gesture or click gesture within display image 910. If, in step 1020, the user input should change the position of the UI control, then the adjustment tool changes the position of the UI control and the method proceeds back to step 1014. Otherwise, the method proceeds to step 1030.

If, in step 1030, the user input does not comprise a command to exit, then the method proceeds to step 1040, where the adjustment tool performs a command associated with the user input. In one embodiment, the command comprises a save command and the adjustment tool then saves the combined image, which is generated according to a position of the UI control. The method then proceeds back to step 1016.

Returning to step 1030, if the user input comprises a command to exit, then the method terminates in step 1090, where the adjustment tool exits, thereby terminating execution.

Of course, in various embodiments, the adjustment tool may be used to blend one or more points of interest, one or more white-balance points, and/or any other parameter associated with the image. In some embodiments, the adjustment tool may relate to a full scene (e.g. entire image, etc.) associated with two or more images. In other embodiments, the adjustment tool may relate to a subset (e.g. a particular point(s), etc.) of the image.

Figure 11:
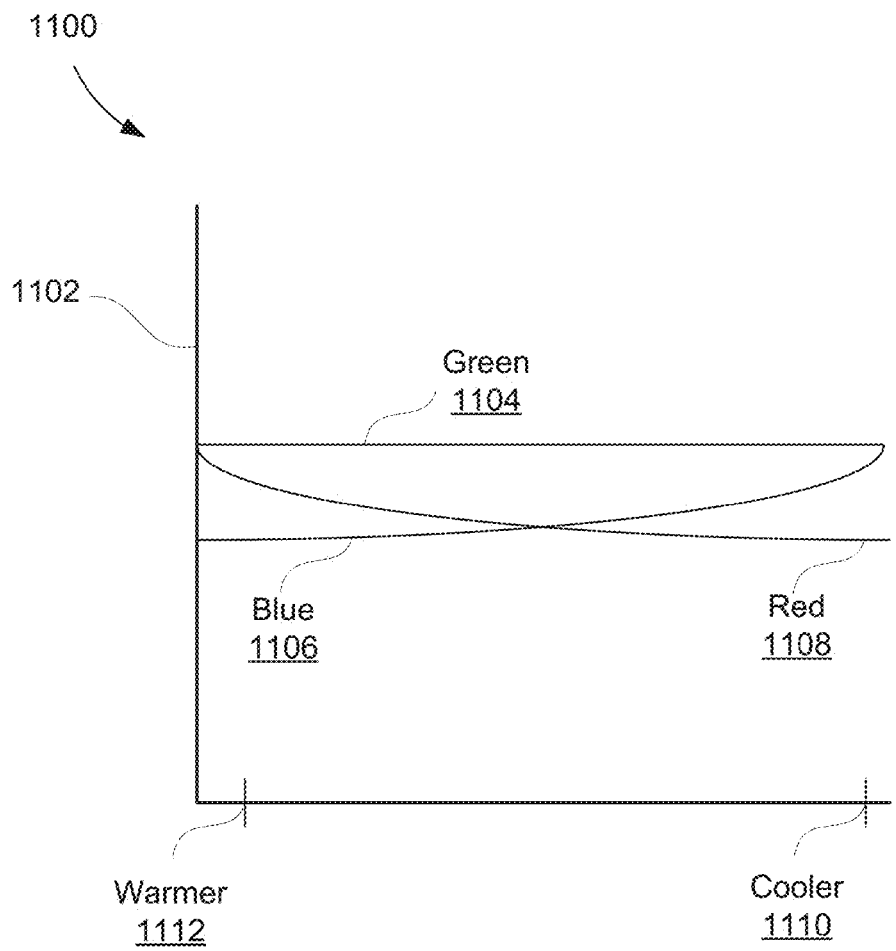
FIG. 11 illustrates a color adjustment graph for altering a color associated with an image, according to one embodiment of the present invention.

FIG. 11 illustrates a color adjustment graph 1100 for altering a color associated with an image, according to one embodiment of the present invention. As an option, the color operation 1100 may be implemented in the context of the details of any of the Figures disclosed herein. Of course, however, the color operation 1100 may be implemented in any desired environment. Further, the aforementioned definitions may equally apply to the description below.

As shown, a color adjustment graph 1102 is included. The color adjustment graph 1102 may include a first color curve, green 1104, a second color curve, blue 1106, and a third color curve, red 1108. Further, a cooler indication point 1110 and a warmer 1112 may be included.

In various embodiments, the color adjustment graph 1102 may relate to color adjustment, including, but not limited to, white balance, warming/cooling, saturation, temperature, color scheme (e.g. b&w, sepia, etc.), selective color schemes (e.g. only display color red, etc.), etc. In one embodiment, the horizontal axis may represent a color adjustment value. Additionally, as shown in one embodiment, as the color adjustment values decrease, the color tone warms (more red, less blue), whereas as the color adjustment values increase, the color tone cools (more blue, less red). In one embodiment, blue and red values may intersect horizontally directly in the middle of the color adjustment graph.

In one embodiment, the vertical axis represents color adjustment values associated with red, green, and blue. The horizontal axis may represent an input value, such as a value corresponding to a position of slider control 930. A red curve 1108 represents a red adjustment value (Cr), a green curve 1104 represents a green adjustment value (Cg), and the blue curve 1106 represents a blue adjustment value (Cb). As shown, Cr is reduced as the input value ranges towards a cooler direction 1110, while Cb is reduced as the input value ranges towards the warmer direction 1112. Each color channel (red, greed, blue) of each pixel within an image may be multiplied by a corresponding adjustment value (Cr, Cg, Cb) to yield a color-adjusted image. A cooler color-adjusted image is produced when the user input ranges towards the cooler direction 1110, while a warmer color-adjusted image is produced when the user input ranges towards the warmer direction 1112.

Figure 12:
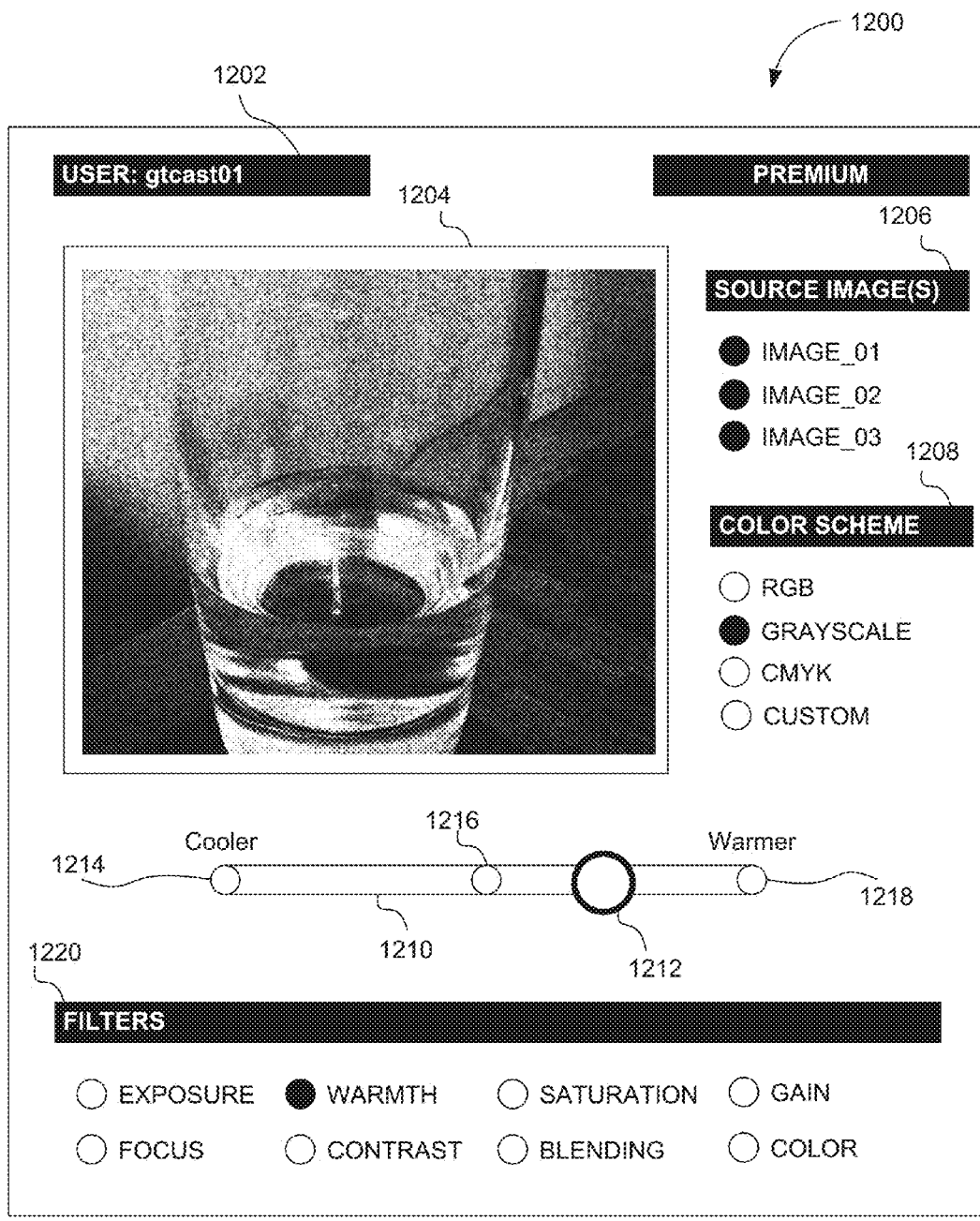
FIG. 12 illustrates a user interface (UI) for a first user, according to one embodiment of the present invention.

FIG. 12 illustrates a user interface (UI) 1200 for a first user, according to one embodiment of the present invention. As an option, the UI 1200 may be implemented in the context of the details of any of the Figures disclosed herein. Of course, however, the UI 1200 may be implemented in any desired environment. Further, the aforementioned definitions may equally apply to the description below.

As shown, user interface 1200 may include a user identification 1202, a resulting image 1204, source image(s) selection 1206, color scheme(s) selection 1208, slider 1210, slider control 1212, a first indication point 1214, a second indication point 1218, a middle indication point 1216, and filter(s) selection 1220.

In one embodiment, the user interface 1200 may be presented for a first user, including, for example, a paying user, for premium access, and/or for a full feature web application, etc. In various embodiments, such an user interface may be adapted for mobile use and/or desktop use.

In various embodiments, a user identification may include any identification relating to a user, including a name, a username, an account id, and/or any other identification. In one embodiment, a resulting image may include a generated image (e.g. from a server, based on modifications from one or more inputs, etc.), a blended image (e.g. from two or more images, etc.), and/or any other image associated with an image package.

In one embodiment, source image(s) selection may include the ability to select which images are used as the basis for processing (e.g. mixing, blending, etc.). For example, in one embodiment, a first image may be an ambient image, and the second and third images may be flash images. The user may select to only include one of the two flash images.

In various embodiments, color scheme may include RGB, grayscale, CMYK, and/or a custom color scheme. Of course, in other embodiments, any color scheme may be included. Additionally, in one embodiment, the slider may be associated with a filter. For example, in one embodiment, a filter may include exposure, focus, warmth, contrast, saturation, blending, gain, and/or color. Of course, in other embodiments, a filter may include other parameters associated with manipulating and/or adjusting the image. Based off of the selection of the filter, the slider may adjust and/or change accordingly. In one embodiment, a selection of warmth may cause a slider to display "cooler" to one side and "warmer" to the other side.

In another embodiment, selection of a filter may cause modification of multiple parameters. For example, in one embodiment, a selection of warmth may cause a slider to display "cooler" and/or "more ambient" on one side and "warmer" and/or "more flash" to the other. Of course, any parameters in combination may be used and manipulated by a single slider. In another embodiment, if multiple parameters are controlled by a single slider, an option may be presented to display multiple sliders, one for each parameter which is being controlled in combination.

Figure 13:
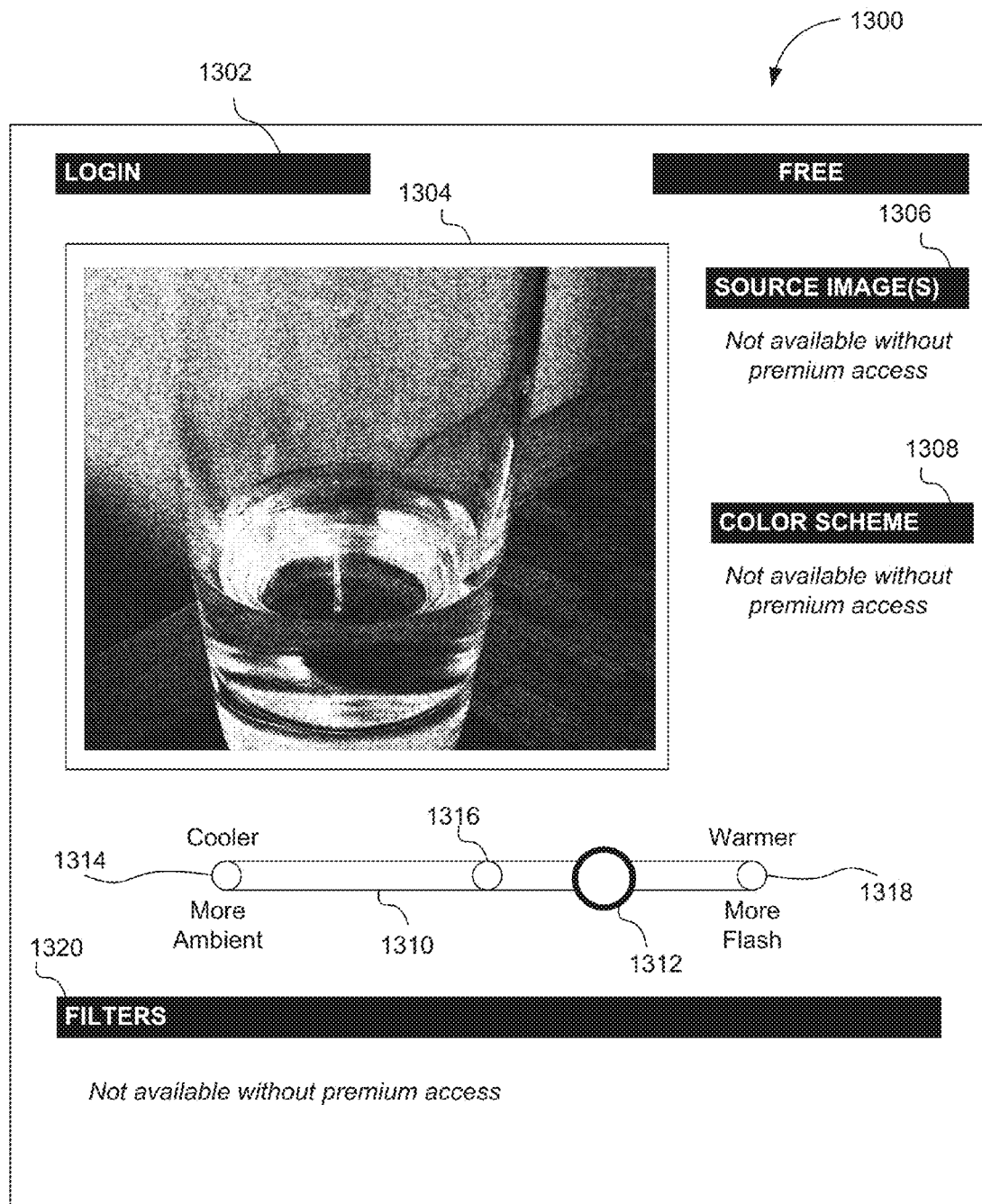
FIG. 13 illustrates a user interface (UI) for a second user, according to one embodiment of the present invention.

FIG. 13 illustrates a user interface (UI) 1300 for a second user, according to one embodiment of the present invention. As an option, the UI 1300 may be implemented in the context of the details of any of the Figures disclosed herein. Of course, however, the UI 1300 may be implemented in any desired environment. Further, the aforementioned definitions may equally apply to the description below.

As shown, user interface 1300 may include a user identification 1302, a resulting image 1304, source image(s) selection 1306, color scheme(s) selection 1308, slider 1310, slider control 1312, a first indication point 1314, a second indication point 1318, a middle indication point 1316, and filter(s) selection 1320.

In one embodiment, the user interface 1300 may be presented for a second user, including, for example, a non-paying user, for free access, and/or for a limited feature web application, etc. In various embodiments, such a user interface may be adapted for mobile use and/or desktop use. As shown, one or more features may be disabled due to the user interface 1300 being of limited features. For example, source image(s) selection, color scheme(s) selection, and filter(s) selection may indicate "Not available without premium access."

In one embodiment, the slider may alter one or more parameters associated with the image. In another embodiment, the slider may alter the warmth and/or control the blending associated with an image. As an example, the slider may display "cooler" and "more ambient" to one side and "warmer" and "more flash" to the other side. Additionally, in one embodiment, because the user interface is of limited functionality, the user may not have the ability to separate the slider into separate sliders for each of the parameters included in the general slider (unlike the full functionality application which may do so). Of course, however, in other embodiments, any of the functionality of the limited feature application may be restricted in any manner. In one embodiment, such restrictions may be defined in the image package sent from the server.

One advantage of the present invention is that a digital photograph may be selectively generated based on user input using two or more different exposures of a single capture of a photographic scene. Accordingly, the digital photograph generated based on the user input may have a greater dynamic range than any of the individual exposures.

Traditional techniques for generating a HDR photograph involve significant computational resources, as well as produce artifacts which reduce the image quality of the resulting image. Accordingly, strictly as an option, one or more of the above issues may or may not be addressed utilizing one or more of the techniques disclosed herein.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   a server for:
      receiving an image package at the server, including:
         at least one image;
         metadata associated with the at least one of one or more images, and
         one or more local URLs to an image resource;
      evaluating the image package by the server including evaluating:
         the at least one image of the image package,
         the metadata associated with the at least one image of the image package, and
         the one or more local URLs to the image resource of the image package, wherein the evaluating comprises:
            processing the image package,
            analyzing the at least one image of the image package, and
            based on the analyzing, determining whether to include one or more filters to the at least one image of the image package,
         wherein the one or more filters include at least one of:
            a first filter to adjust an exposure associated with the at least one image,
            a second filter to adjust a color tone associated with the at least one image, and
            a third filter to adjust a contrast associated with the at least one image;
         based on the analyzing and the determining, generating a first image based on the at least one image, or generating an output capable of being used for generating a first image based on the at least one image;
      creating a specification referencing at least one of:
         the at least one image of the image package,
         the one or more filters,
         the first image or the output,
         the metadata associated with the at least one image of the image package, and
         the one or more local URLs to the image resource:
      after the evaluating, generating image processing code based on the specification, wherein the image processing code allows the first image to be regenerated by a client;
      creating a revised image package including at least two of:
         the image processing code;
         the one or more local URLs; and
         the first image;
      sharing the revised image package.

2. The apparatus of claim 1, wherein the apparatus is operable such that the specification is based on the server determining that the at least one image is overexposed, the color tone is incorrect, or that the contrast is incorrect, and in response, applying the one or more filters to adjust at least one of the exposure, color tone, and contrast.

3. The apparatus of claim 1, wherein the apparatus is operable such that the revised image package allows a user to modify the one or more filters, wherein the one or more filters are each associated with a weight value defined in the specification.

4. The apparatus of claim 1, wherein the apparatus is operable such that the generating image processing code based on the specification includes at least one of providing access to a constructed web application associated with the at least one image, or pushing the web application associated with the at least one image to a recipient.

5. The apparatus of claim 4, wherein the apparatus is operable such that sliding indicia is displayed utilizing the web application and the at least one image are blended based on a first aspect, in response to the sliding indicia being manipulated by a user.

6. The apparatus of claim 5, wherein the apparatus is operable such that the first aspect includes at least one of a white balance, a focus, an exposure, a color correction, or an intensity.

7. The apparatus of claim 1, wherein the apparatus is operable such that the generating image processing code based on the specification includes at least one of providing access to code created for rendering vector graphics in a web application, or providing access to the first image which references the one or more local URL.

8. The apparatus of claim 7, wherein the apparatus is operable such that the generating image processing code based on the specification includes providing access to the first image which references the one or more local URLs, and the apparatus is further operable such that the one or more local URLs reference assets stored locally on a mobile device.

9. The apparatus of claim 8, wherein the apparatus is operable such that the generating image processing code includes referencing the one or more local URLs which include assets stored locally on the mobile device, as well as the first image stored on the server.

10. The apparatus of claim 1, wherein the apparatus is operable such that the first image is stored on the server.

11. The apparatus of claim 1, wherein the apparatus is operable for constructing two or more versions of a web application associated with the revised image package.

12. The apparatus of claim 11, wherein the apparatus is operable such that at least one of the two or more versions is associated with a paying account.

13. The apparatus of claim 12, wherein the apparatus is operable such that the paying account is associated with a user identifier or a user account.

14. The apparatus of claim 11, wherein the apparatus is operable such that at least one of the two or more versions is associated with a free account.

15. The apparatus of claim 11, wherein the apparatus is operable such that each version of the web application provides a different set of features, at least in part, by which the at least one image are capable of being manipulated utilizing the web application.

16. The apparatus of claim 1, wherein the apparatus is operable such that analyzing the one or more images of the image package includes the server determining that an additional filter should be applied to the at least one image, the additional filter including at least one of a white balance, an exposure level, a black point, a white point, a focus amount, a warmth level, a saturation level, a blending value, and a dehaze function.

17. The apparatus of claim 16, wherein the additional filter further includes a HDR strength, the HDR strength being used, at least in part, to create a high dynamic range (HDR) image.

18. The apparatus of claim 16, wherein the additional filter includes at least two of a white balance, an exposure level, a black point, a white point, a focus amount, a warmth level, a saturation level, a blending value, and a dehaze function.

19. A computer program product embodied on a non-transitory computer readable medium, comprising:
code for receiving an image package at a server, including:
at least one image;
metadata associated with the at least one of one or more images, and
one or more local URLs to an image resource;
code for evaluating the image package by the server including evaluating:
the at least one image of the image package,
the metadata associated with the at least one image of the image package, and
the one or more local URLs to the image resource of the image package, wherein the evaluating comprises:
code for processing the image package,
code for analyzing the at least one image of the image package, and
based on the analyzing, code for determining whether to include one or more filters to the at least one image of the image package, wherein the one or more filters include at least one of:
a first filter to adjust an exposure associated with the at least one image,
a second filter to adjust a color tone associated with the at least one image, and
a third filter to adjust a contrast associated with the at least one image:
based on the analyzing and the determining, code for generating a first image based on the at least one image, or generating an output capable of being used for generating a first image based on the at least one image;
code for creating a specification referencing at least one of:
the at least one image of the image package,
the one or more filters,
the first image or the output,
the metadata associated with the at least one image of the image package, and
the one or more local URLs to the image resource;
after the evaluating, code for generating image processing code based on the specification, wherein the image processing code allows the first image to be regenerated by a client;
code for creating a revised image package including at least two of:
the image processing code;
the one or more local URLs; and
the first image:
code for sharing the revised image package.

20. A method, comprising:
receiving an image package at a server, including:
at least one image;
metadata associated with the at least one of one or more images, and
one or more local URLs to an image resource;
evaluating the image package by the server including evaluating:
the at least one image of the image package,
the metadata associated with the at least one image of the image package, and
the one or more local URLs to the image resource of the image package, wherein the evaluating comprises:
processing the image package;
analyzing the at least one image of the image package, and
based on the analyzing, determining whether to include one or more filters to the at least one image of the image package, wherein the one or more filters include at least one of:
a first filter to adjust an exposure associated with the at least one image,
a second filter to adjust a color tone associated with the at least one image, and
a third filter to adjust a contrast associated with the at least one image:
based on the analyzing and determining, generating a first image based on the at least one image, or generating an output capable of being used for generating a first image based on the at least one image;
creating a specification referencing at least one of:
the at least one image of the image package,
the one or more filters,
the first image or the output,
the metadata associated with the at least one image of the image package, and
the one or more local URLs to the image resource;
after the evaluating, generating image processing code based on the specification, wherein the image processing code allows the first image to be regenerated by a client;
creating a revised image package including at least two of:
the image processing code;
the one or more local URLs; and
the first image:
sharing the revised image package.

* * * * *